United States Patent [19]
Sekiguchi

[11] Patent Number: 5,579,161
[45] Date of Patent: Nov. 26, 1996

[54] IMAGE DISPLAY APPARATUS

[75] Inventor: Nobutoshi Sekiguchi, Tokyo, Japan

[73] Assignee: Olympus Optical Co., Ltd., Tokyo, Japan

[21] Appl. No.: 150,358

[22] Filed: Nov. 9, 1993

[30] Foreign Application Priority Data

Nov. 12, 1992 [JP] Japan .................................. 4-302160
Sep. 7, 1993 [JP] Japan .................................. 5-246206

[51] Int. Cl.$^6$ ................................................. G02B 27/46
[52] U.S. Cl. ......................................................... 359/559
[58] Field of Search ............................................. 359/559

[56] References Cited

U.S. PATENT DOCUMENTS

| | | | |
|---|---|---|---|
| 4,347,508 | 8/1982 | Spooner | 340/705 |
| 4,772,101 | 9/1988 | Liu | 359/41 |
| 5,079,555 | 1/1992 | Turpin | 342/25 |
| 5,106,179 | 4/1992 | Kamaya | 351/158 |
| 5,426,521 | 6/1995 | Chen et al. | 359/559 |

FOREIGN PATENT DOCUMENTS

| | | |
|---|---|---|
| 0473343A1 | 3/1992 | European Pat. Off. . |
| 59-119982 | 7/1984 | Japan . |
| 1-124434 | 5/1989 | Japan . |
| 2-136818 | 5/1990 | Japan . |
| 3-51167 | 8/1991 | Japan . |
| 3-214872 | 9/1991 | Japan . |
| WO84/00831 | 3/1984 | WIPO . |

OTHER PUBLICATIONS

F. A. Jenkins and H. E. White, Fundamentals Of Optics, 4th ed. McGraw–Hill, 1981, pp. 259–265.
Patent Abstracts Of Japan, vol. 15, No. 309 (P–1235) Aug. 7, 1991 & JP–A–03 110 592 (Casio) May 10, 1991.
Patent Abstracts Of Japan, vol. 14, No. 369 (P–1090) Aug. 9, 1990 & JP–A–02 136 818 (Sony) May 25, 1990.
SPIE Display System Optics, vol. 778, 1987, pp. 70–78, M. Shenker, "Optical Design Criteria For Binocular Helmet–Mounted Displays".

*Primary Examiner*—Georgia Y. Epps
*Assistant Examiner*—Thomas Robbins
*Attorney, Agent, or Firm*—Frishauf, Holtz, Goodman, Langer & Chick

[57] ABSTRACT

An image display apparatus comprises an image display unit capable of producing and displaying not an image itself but a Fourier-transform image of the image, and a light transmission unit for focusing the Fourier-transform image produced and displayed on the image display unit on a pupil face of an observer's eye and producing an original image on the retina of the eye. The light transmission unit includes a lens and an eye lens such that an image-side focal position of the lens coincides with an object-side focal position of the eye lens. A mask is situated at the object-side focal position of the eye lens to determine the range and shape of a visual field. The image display unit is situated at an image-side focal position of the lens, and the pupil face of the observer's eye is alinged at an image-side focal position of the eye lens.

32 Claims, 13 Drawing Sheets

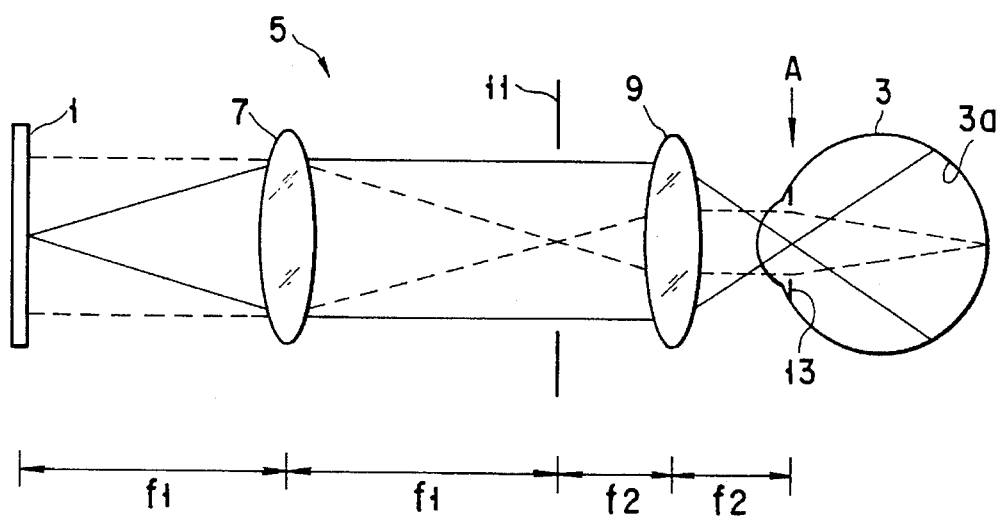
FIG. 1
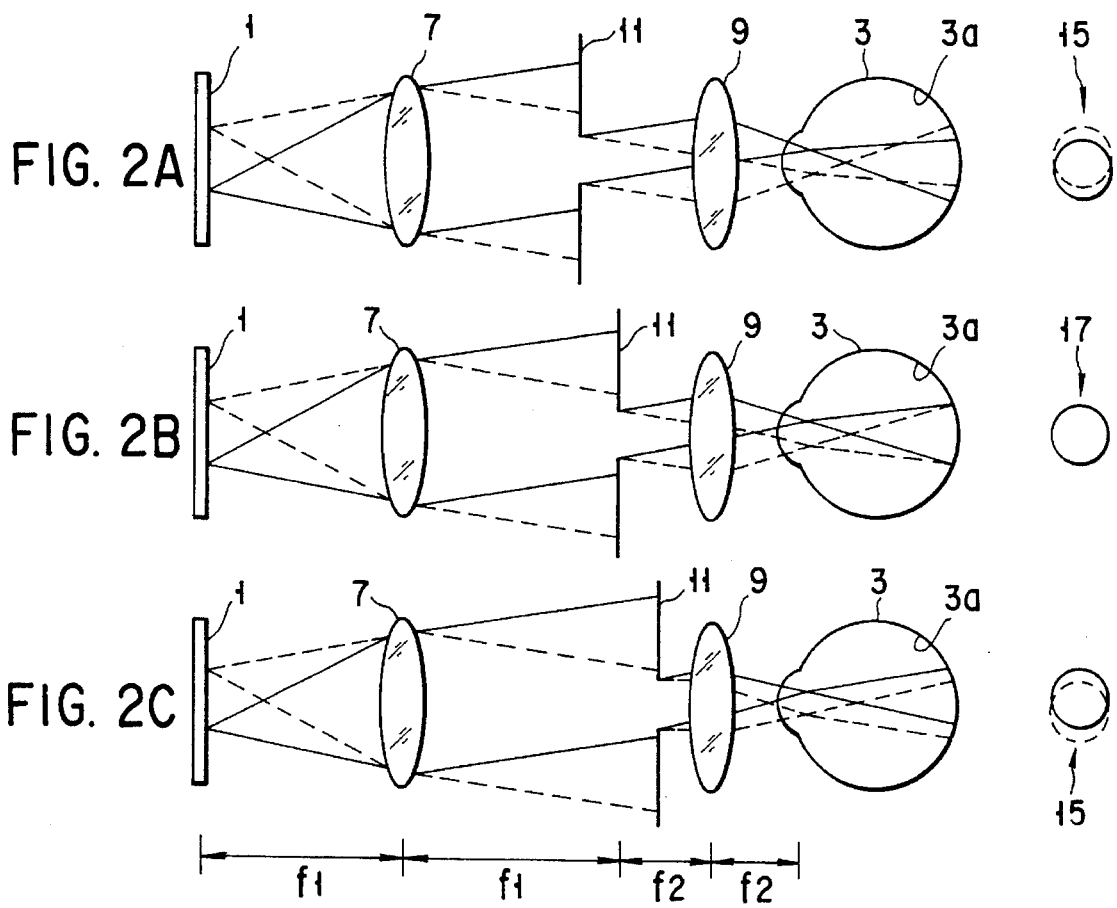

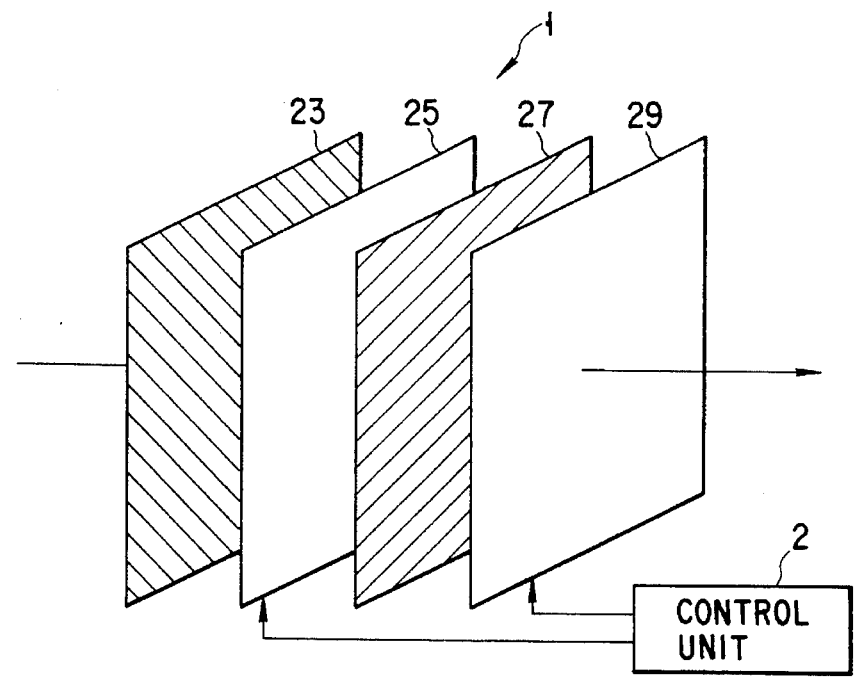
F I G. 4
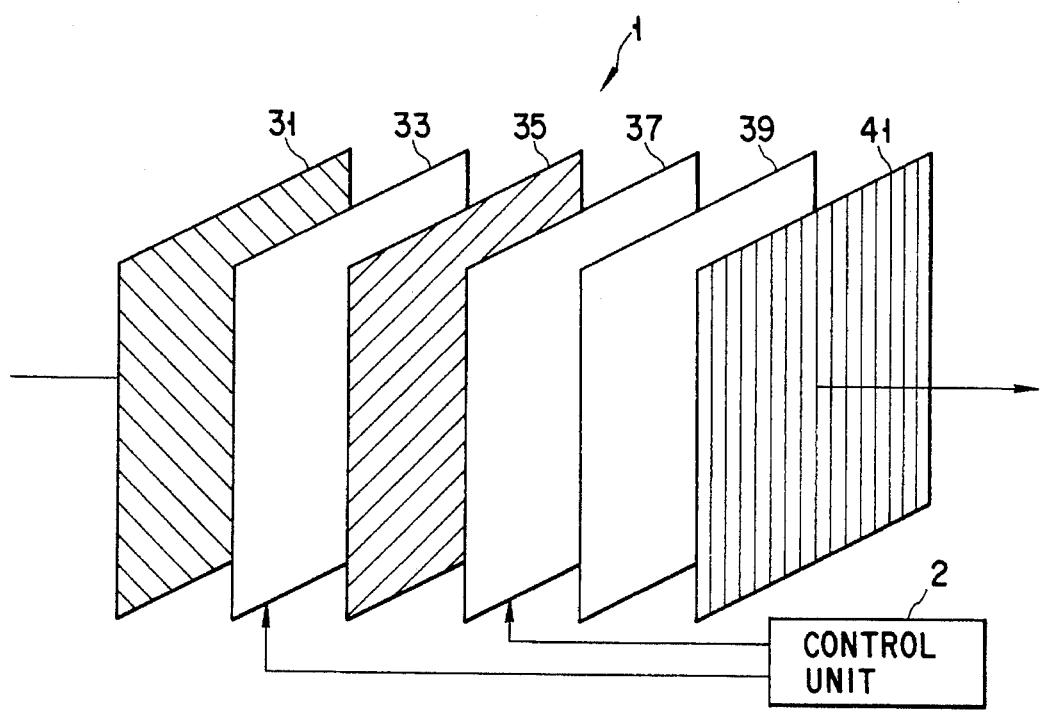
F I G. 5

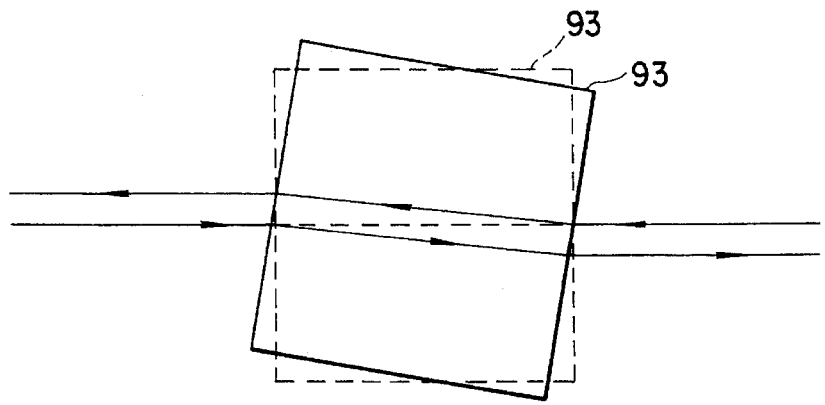
F I G. 10
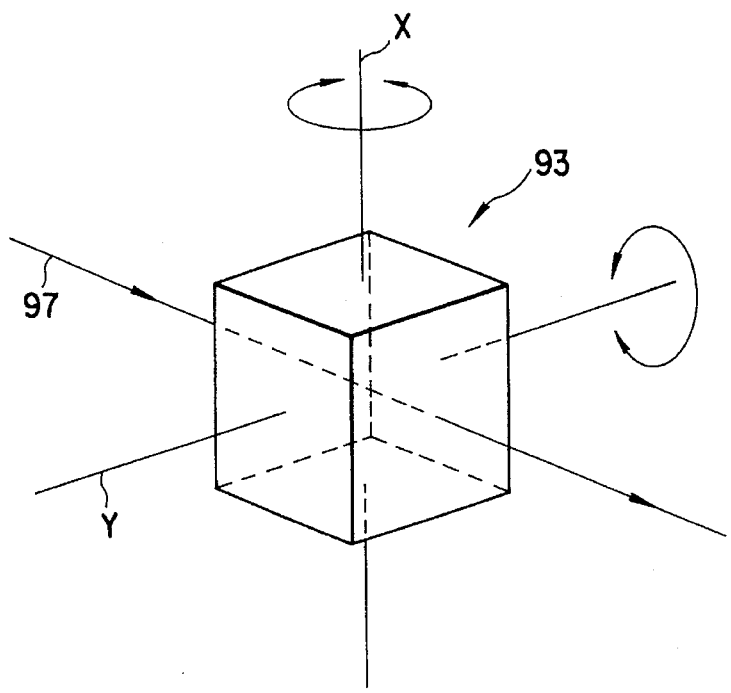
F I G. 11A
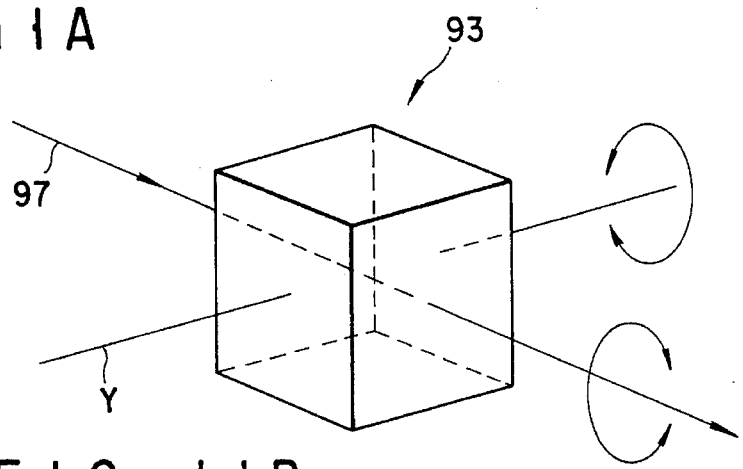
F I G. 11B

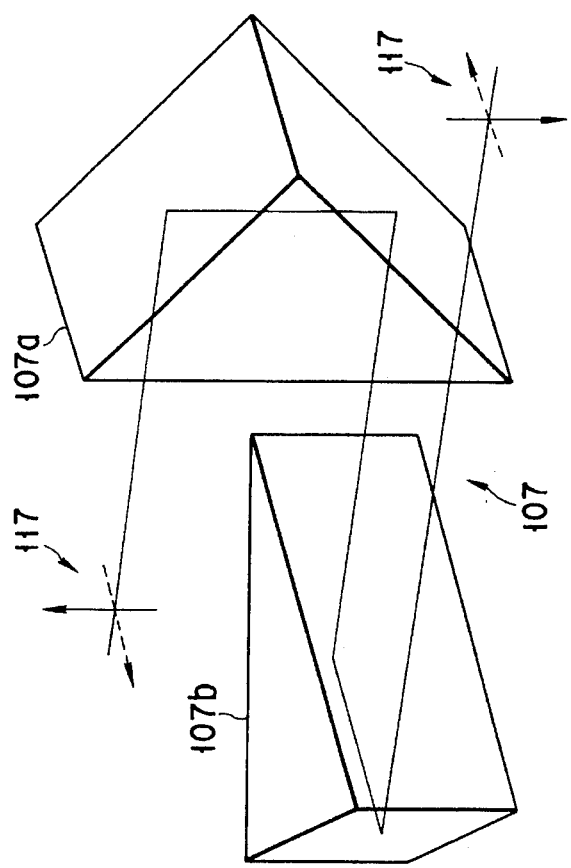
FIG. 13
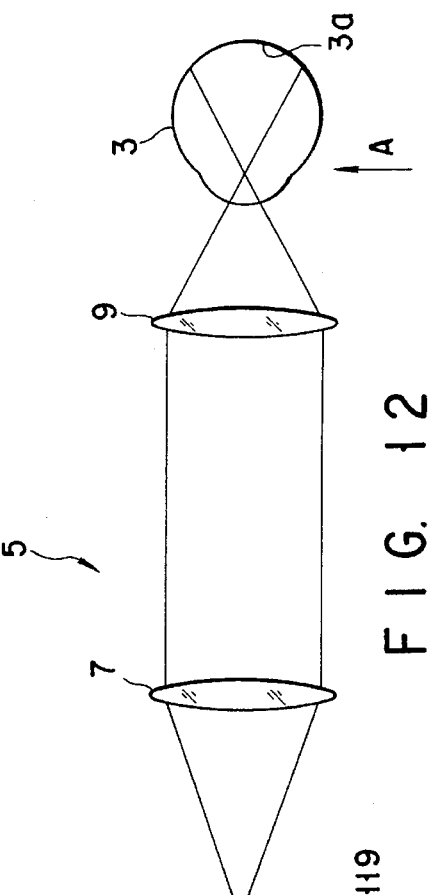
FIG. 12
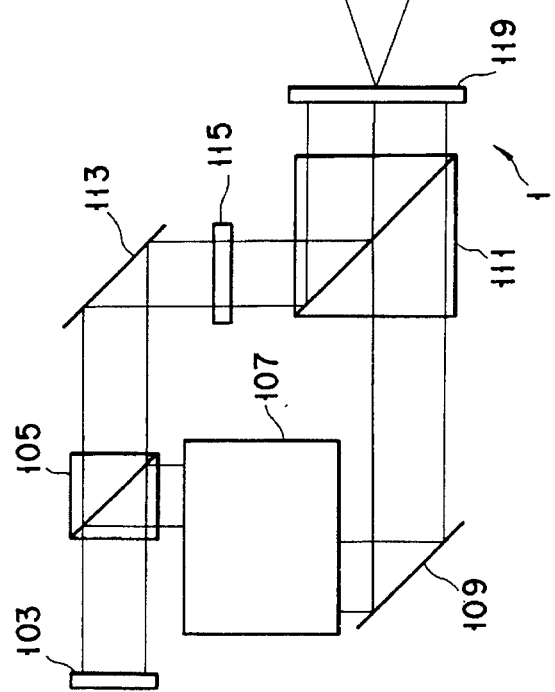

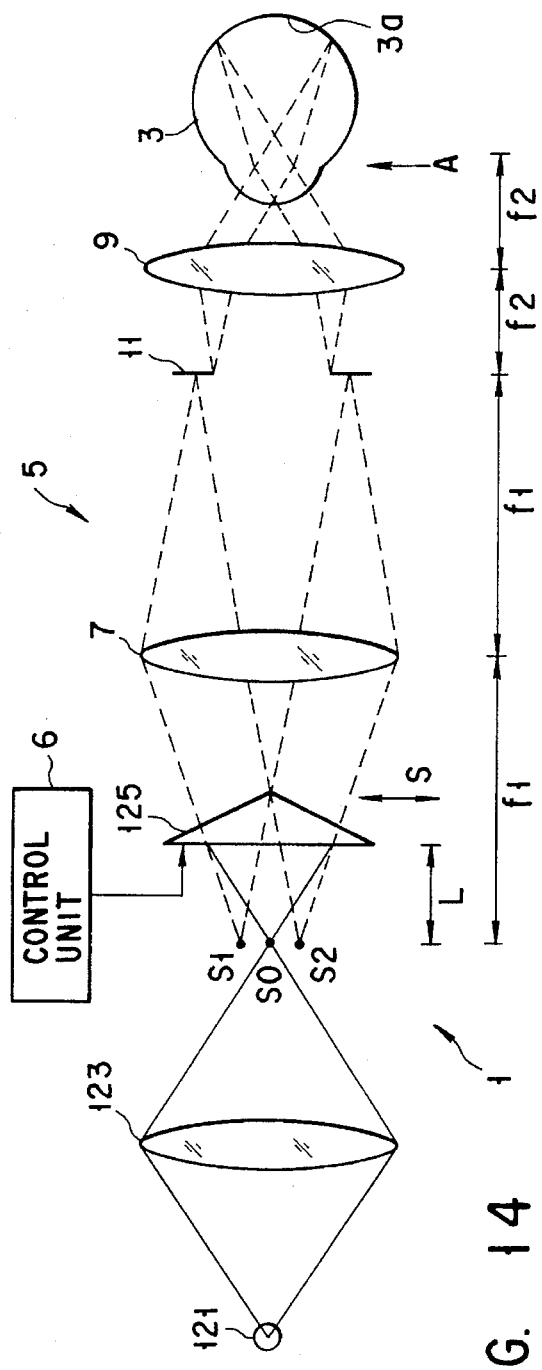
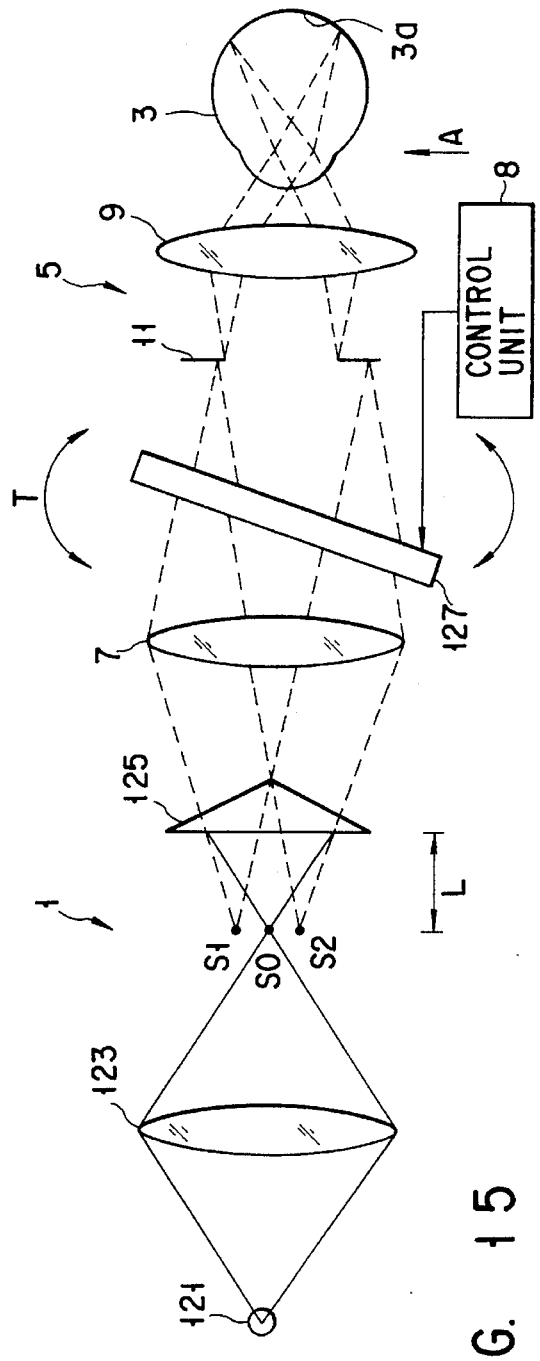
F I G. 14
F I G. 15

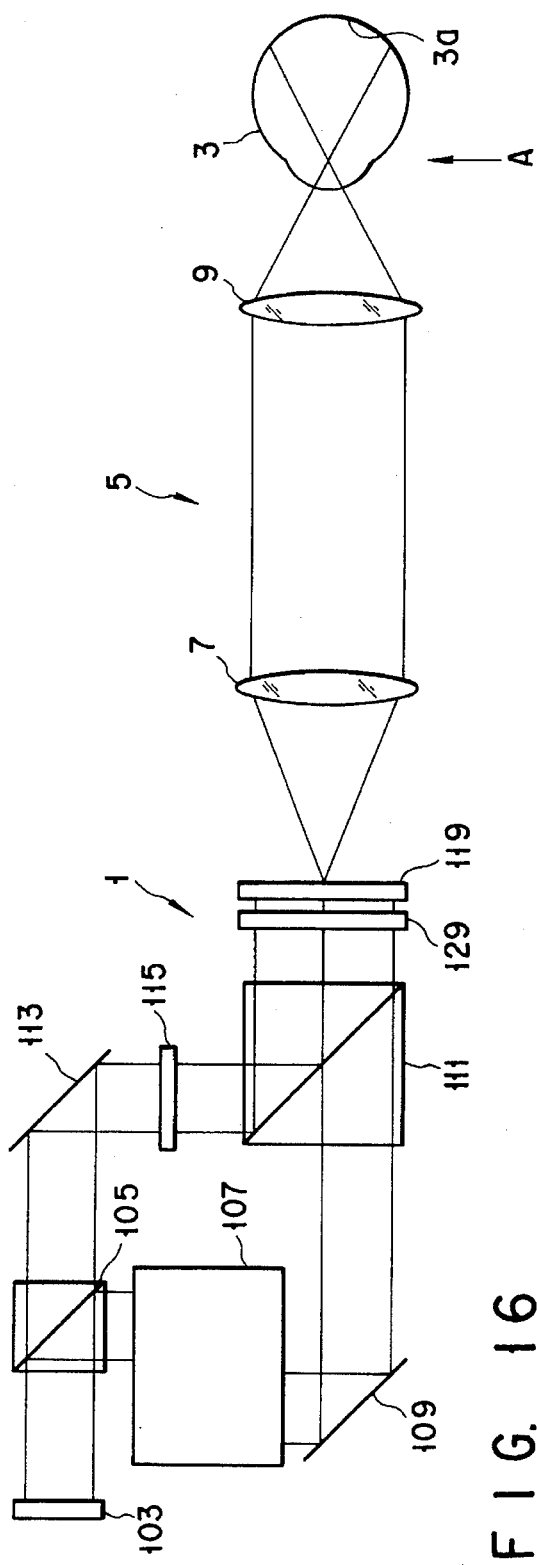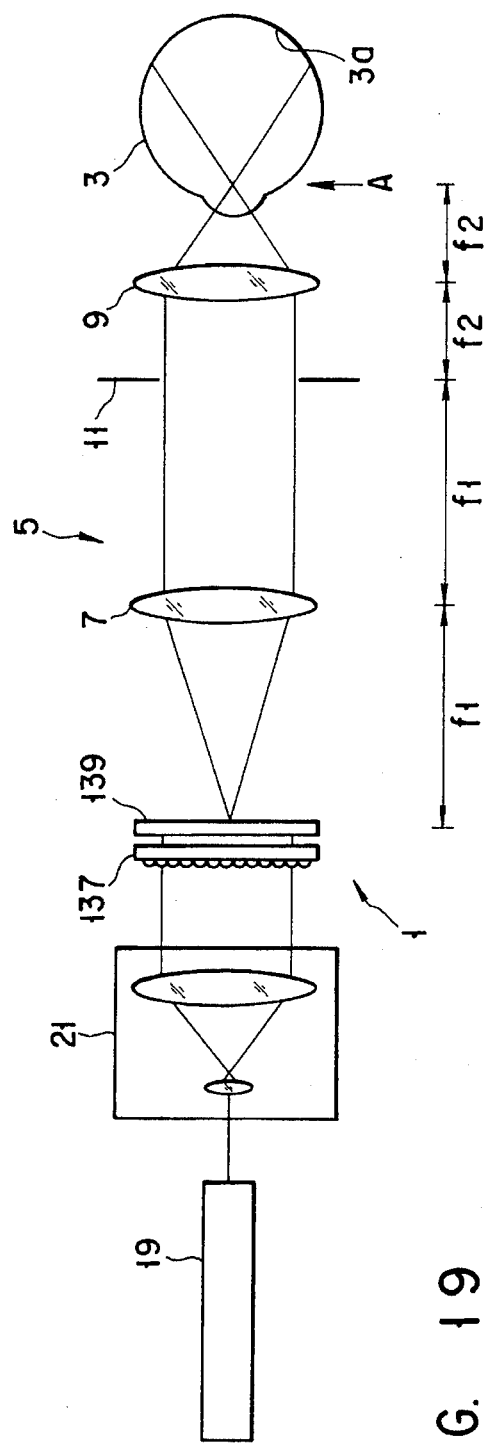
FIG. 16
FIG. 19

IMAGE DISPLAY APPARATUS

BACKGROUND OF THE INVENTION

1. Field of the Invention

The present invention relates to an image display apparatus for projecting and displaying a wide-image-angle, high-fine image on the retina.

2. Description of the Related Art

In a conventional apparatus of this type, an image display portion and an observer's retina conjugate with each other. An image produced by a display element of an image display unit is transmitted through an image transmission medium and then focused on the retina by the optical system of the eye.

There is known a conventional, simple method for producing a wide-image-angle, realistic image by using the above apparatus. In this method, an image on the display element is enlarged and displayed on the retina (Prior Art 1).

Production of image on the retina is based on the refraction of the eye. Thus, in the conventional apparatus, if a person with abnormal refraction performs observation, he/she must put on glasses, contact lenses or the like in order to add a function for visibility adjustment to the optical system and thereby to correct the abnormal refraction.

According to another method for correction, a high-fine image free from diffraction or aberration can be reproduced on the retina by bypassing the optical system of the observer's eye.

Jap. Pat. Appln. KOKOKU Publication No. 3-51167, for example, dislcose methods for reproducing an image on the retina by bypassing the optical system of the eye.

In these methods, by producing two point light sources which can interfers with the pupil face of the eye, a Young interference fringe is formed on the retina.

At this time, the pupil eye and retina have a relationship of Fourier inverse transform. The spatial frequency of interference fringe is set at a distance between the point light source, and the direction in which the fringe extends is perpendicular to the direction of arrangement of point light sources formed on the pupil face.

Since the optical system of the eye is not concerned with the formation of the interference fringe, the image can be formed on the retina with a high contrast, even when an interference fringe of high spatial frequency has been produced.

Another method of reproducing an image on the retina by bypassing the optical system of the eye is disclosed, for example, in Jap. Pat. Appln. KOKAI No. 2-136818 (Prior Art 2).

In this method, the image produced by the display element is directly focused on the observer's retina via an eye lens situated just in behind of the display element.

However, in the apparatus of Prior Art 1, since the pixels of the display element are enlarged along with the image, it is possible that each pixel is sensed or a band is limited, resulting in degradation in image quality. Specifically, the spatial resolution characteristics of the entire optical system are restricted by the spatial resolution characteristics of the display element.

In the apparatus of Prior Art 2, the image can be formed on the retina, without depending on the optical characteristics of the eye. However, like Prior Art 1, if the image of the display element is enlarged to obtain the wide-image-angle retinal image, the pixels of the image of the display element are also enlarged, and each pixel is sensed. Thus, the spatial resolution characteristics of the entire optical system are restricted by the spatial resolution characteristics of the display element.

SUMMARY OF THE INVENTION

The present invention has been made to solve the above problems, and its object is to provide an image display apparatus capable of forming a wide-image-angle, high-fine image on the retina, without influence due to the resolution of an image display element or optical characteristics of the eye.

In order to achieve this object, there is provided an image display apparatus comprising: an image display unit for producing and displaying a Fourier-transform of an image; and a light transmission unit for focusing said Fourier-transform produced and displayed on said image display unit on a pupil face of an observer's eye, thus producing an original image on the retina of the eye.

Thus, the image display apparatus according to this invention can produce a wide-image-angle, high-fine image on the retina, without influence due to the resolution of an image display element or optical characteristics of the eye.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows schematically the structure of an optical system, illustrating the principle of the present invention;

FIGS. 2A, 2B and 2C illustrate the state in which there is alignment between the optical system shown in FIG. 1 and the observer's eye;

FIG. 4 is a perspective view showing schematically the structure of an image display unit provided in the apparatus shown in FIG. 3;

FIG. 5 is a perspective view showing schematically the structure of an image display unit provided in an image display apparatus according to a second embodiment of the invention;

FIG. 10 shows the state in which an optical member applied to the apparatus in FIG. 9 is inclined and thereby two laser beams are shifted with respect to an optical axis;

FIGS. 11A and 11B show the state in which the spatial frequency and the direction of interference fringe are controlled by rotating the optical member about two rotational axes;

FIG. 12 shows schematically the structure of an image display apparatus according to a :sixth embodiment of the invention;

FIG. 13 is a perspective view showing schematically the structure of image rotation means applied to the apparatus shown in FIG. 12;

FIG. 14 shows schematically the structure of an image display apparatus according to a seventh embodiment of the invention;

FIG. 15 shows the state in which an optical member applied to the apparatus shown in FIG. 14 is rotated, thereby displacing the image position of two point light sources produced on the pupil face;

FIG. 16 shows schematically the structure of an image display apparatus according to an eighth embodiment of the invention;

FIG. 19 shows schematically the structure of an image display apparatus according to a tenth embodiment of the invention;

DETAILED DESCRIPTION OF THE PREFERRED EMBODIMENTS

Figure 3:
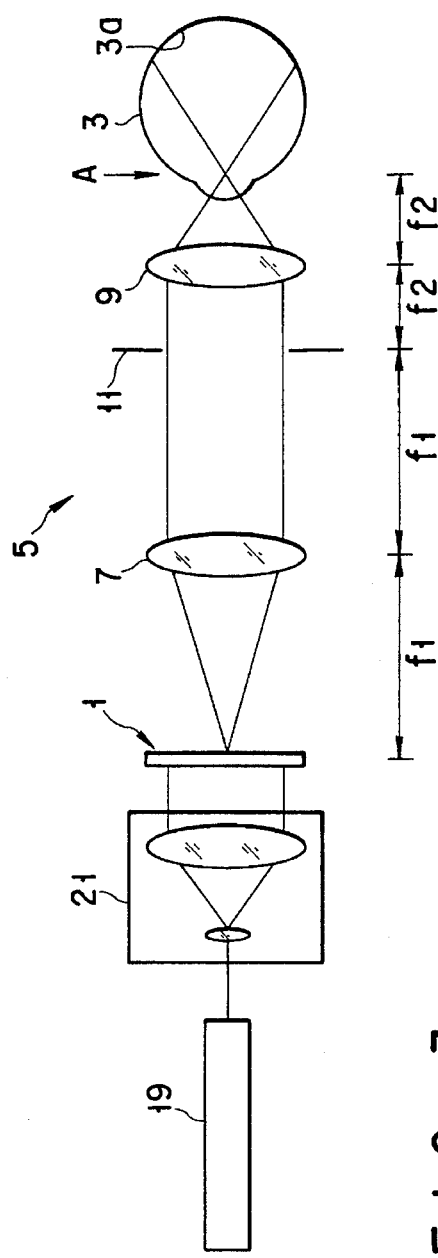
FIG. 3 shows schematically the structure of an image display apparatus according to a first embodiment of the present invention.

At first, the principle of the invention will now be described, and then embodiments of the present invention to which this principle has been applied will be described.

FIG. 1 shows schematically the structure of an image display optical system for explaining the principle of the present invention.

As is shown in FIG. 1, the image display optical system to which the principle of the invention has been applied comprises an image display unit 1, which can produce and display a Fourier transform image (the Fourier transform image is not an image itself), and a light transmission unit 5 for focusing the Fourier transform image, produced and displayed on the image display 1, onto a pupil face A of the eye 3 of the observer and and produces the original image on the retina 3a of the eye 3.

The light transmission unit 5 comprises a lens 7 (focal distance: f1) and an eye lens 9 (focal distance: f2), so that the image-side focal position of the lens 7 coincides with the object-side focal position of the eye lens 9.

A mask 11 is situated on the object-side focal position of the eye lens 9 (i.e. the image-side focal position of lens 7). The mask 11 determines the field of vision, the shape of the field of vision, etc.

The image display unit 1 is situated at the object-side focal position of the lens 7, and the pupil face A of the observer's eye 3 is aligned at the image-side focal position of the eye lens 9.

By this structure, opticaly conjugate positional relationship is established between the image display unit 1 and the pupil face A of the eye 3 as well as between the image-side focal position of the lens 7 and the retina 3a.

Since the Fourier transform relationship is established between the image display unit 1 and the image produced on the image-side focal plane of the lens 7 (i.e. the object-side focal plane of the eye lens 9), an image equivalent to the original image is formed on the image-side focal plane of the lens 7.

The produced original image is transmitted to the retina 3a which is in an optically conjugate relationship with the image-side focal plane of the lens 7, and the produced original image is formed on the retina 3a as a retinal image.

Since Fourier transform is optically performed between the image display unit 1 and retina 3a, the original image can be displayed on the retina 3a substantially with no delay.

In the meantime, a general image is expressed as a sum of sine waves having various spatial frequencies, directions of fringe, amplitudes and phases. In addition, a Fourier transform image of such sine waves is expressed on a spatial frequency plane by a DC component and a pair of point light sources which are in rotational symmetry with each other with respect to the DC component as a center. Accordingly, the Fourier transform image of the general image is expressed as synthesis of many pairs of point light sources.

A spatial frequency f(c/deg) of sine wave produced on the retina 3a is substantially proportional to a distance d(mm) between a pair of point light sources produced on the pupil face. If light wavelength is λ (mm), the spatial frequency f(c/deg)can approximately be expressed by $$f = \pi d / 180 \lambda$$

In this formula, the spatial frequency f is expressed as the number of cycles per degree of visual angle.

A factor for applying limitations to the spatial frequency is, e.g. the phenomenon that either or both point light sources are shielded by the pupil 13 of the eye 3 and a sine wave component is not formed on the retina 3a if the distance (d) between the pair of point light sources is subtantially equal to, or greater than, the diameter of the pupil.

The diameter of the pupil of the human eye 3 varies in the range of 2 to 8 mm in accordance with the level of ambient lightness. Supposing that the diameter of the pupil is 2 mm, the spatial frequency with respect to the wavelength (about 555 mm) at which the human visual mechanism has a highest sensitivity in a light place can be raised up to 63 c/deg at maximum.

In general, the spatial resolution of the human eye is 50 to 60 c/deg under optimal conditions. The limitations caused by the pupil diameter upon the reproduction of high spatial frequency component of image is very low.

The direction in which the sine wave fringe produced on the retina can be expressed as a direction perpendicular to the direction of arrangement of point light sources produced on the pupil face. In addition, the amplitude and phase components of the sine wave component are expressed, respectively, by the difference in length of optical path related to the point light sources cooperating with the intensity of the point light sources.

Compared to the conventional image display method, the principle of the present invention has the following excellent advantages (1) to (3):

(1) By the method of focusing a Fourier transform image on the pupil face A of the eye 3 and producing an original image on the retina 3a, the original image can be produced on the retina without influence of optical characteristics of the eye such as diffraction, aberration or de-focusing.

Thus, the spatial resolution characteristics of the display image are not limited by the optical characteristics of the eye 3. In addition, the original image can be produced with high contrast even at a high spatial frequency component.

Accordingly, even if the observer's eye 3 has abnormal diffraction, there is no need to correct it. Furthermore, even when images are displayed on both eyes, there is no need to adjust the visibility of both eyes.

(2) According to the present principle, the positional relationship between the image display unit 1 and retina 3a differs from the conventional one, and the image display unit 1 and retina 3a do not have conjugated relationship. Thus, the spatial resolution characteristics of the display image are not limited by the spatial resolution characteristics of the image display unit 1.

(3) The obtained image angle is determined, independently from the image resolution characteristics, in accordance with the F number of the eye lens 9 or the size of the pixel of the image display unit 1. Thus, the wide-image-angle image can be formed on the retina 3a by using a lens with a low F number as eye lens 9 or by reducing the size of each pixel of the image display unit 1.

Now referring to FIGS. 1 and 2, the alignment of the observer's eye with respect to the aforementioned image display optical system will be described.

The alignment of the eye 3 is constant, irrespective of the nature or kind of observed images. Normally, it suffices to carry out the alignment once at the time of starting the use of the optical system. The directions of alignment are two: the direction of the optical axis of the optical system, and a direction in a plane perpendicular to the direction of the optical axis. As regards general use, there is no need to strictly conduct the alignment in either direction.

If the Fourier transform image is focused near the pupil face A in the optical-axis directional alignment, the quality of the original image produced on the retina 3a will have no problem.

The image display optical system and the eye 3 are moved relative to each other in the direction of optical axis and a slight correction is made. Thereby, degradation of image quality caused by speckle noise (interference noise due to optical non-uniformity of optical medium within the eyeball), which occurs when a light source with high coherence such as a laser is used, can be degreased.

The degree of influence of speckle noise occurring within the eye ball depends, in many cases, on the position within the eyeball at which the image of the image display unit 1 is focused. Thus, the above-described correction technique is effective.

Besides, the alignment of the observer's eye 3 in a plane perpendicular to the optical axis has no practical problem if the optical axis of the optical system (at which the DC component of the Fourier transform image is displayed) coincides substantially with the center of the pupil.

After the alignment of the eye 3 is completed, however, it is necessary to adjust the position of the mask 11.

As a method of positioning the mask 11, there is known a method in which the mask 11 is moved in the direction of the optical axis so that the "sharpest" image can be viewed. However, some ambiguity remains in the determination of this method.

In the present principle, therefore, a method for setting the mask 11 at an objectively optimal position is proposed.

FIG. 2 shows the state in which a sine-wave Fourier transform image of a high spatial frequency, which is produced and displayed on the image display unit 1, is displayed in the eye 3.

As is shown in FIGS. 2A and 2C, when the mask 11 (shown in the figures as a circular opening) is situated on the object side (see FIG. 2A) or the image side (see FIG. 2C) with respect to the object-side focal position of the eye lens 9, the original image is sensed as two mask images (indicated by broken lines and solid lines) on the retina 3a of the eye 3.

On the other hand, if the mask 11 is situated near the object-side focal position of the eye lens 9 (i.e. the image-side focal position of the lens 7), the outer peripheries of the two mask images are aligned and a single circular visual field 17 (indicated by a solid-line circle) is sensed.

Accordingly, the optimal arrangement position of the mask can be determined by moving the mask 11 in the direction of optical axis and aligning the mask 11 at the position where the sine-wave Fourier transform image of high spatial frequency produced and displayed on the image display unit 1 is sensed as a mask image on the retina 3a (i.e. the position shown in FIG. 2B).

The position of the mask determined by this method depends on the refraction of the observer's eye 3. For example, in the case of long sight, the position of the mask is set on the object side (see FIG. 2A) with respect to the object-side focal position of the eye lens 9. In the case of short sight, the position of the mask is set on the image side (see FIG. 2C) with respect to the object-side focal position of the eye lens 9.

It is possible to situate masks of various patterns at the position of the arranged mask 11, thereby superposing the patterns on the display image.

In the case where an image of very high contrast must be displayed, it is necessary to precisely align the observer's eye 3 in a plane perpendicular to the optical axis of the image display optical system. The reason is that the contrast of the sine-wave image produced on the retina 3a depends on the relative insensities of the paired point light sources. When the intensities are equal, a highest contract can be achieved.

On the other hand, the efficiency with which the light reaching the retina 3a is absorbed in the optical cells varies, depending on the position of the pupil through which the light passes to reach the retina 3a ("Stiles-Crawford Effect").

The peak value of this efficiency (=Stiles-Crawford maximum) is located at a point distanced slightly from the center of the pupil. As the point becomes farther from the peak point, the efficiency decreases symmetrically in all directions.

By aligning the optical axis of the image display optical system at the Stiles-Crawford maximum, the intensities of the paired point light sources can be equalized and the highest contrast achieved.

A method for aligning the optical axis of the image display optical system at the Stiles-Crawford maximum will now be briefly described.

As is shown in FIGS. 2A and 2C, the mask 11 is intentionally moved from the optimal position to the vicinity of the lens 7 or eye lens 9, and thus two mask images 15 are produced on the retina 3a.

The amount of displacement of the two mask images 15 increases as the the spatial frequency of the sine-wave Fourier transform image produced on the image display unit 1 becomes higher.

Subsequently, the observer aligns the eye 3 in the direction of displacement of two mask images 15 (i.e. a direction in the plane of the sheet of FIG. 2 perpendicular to the optical axis) so that the lightness of the two mask images 15 is sensed to be equal.

There is no practical problem if the alignment is carried out in two mutually perpendicular directions.

When the brightnesses of the two mask images are set to be physically equal to each other, the alignment between the Stiles-Crawford maximum of the eye 3 and the optical axis of the image display optical system can be achieved by the above method.

An image display apparatus according to a first embodiment of the present invention, to which the above-described principle is applied, will now be described with reference to FIGS. 3 and 4. In the following description, the elements already mentioned in the above description of the principle are denoted by like reference numerals, and a description thereof is omitted.

As is shown in FIG. 3, this image display apparatus comprises a laser 19 for outputting a predetermined laser beam; a beam expander 21 for expanding the laser beam emitted from the laser 19 and restricting the laser beam to a parallel beam and outputting the parallel beam; an image display unit 1 irradiated by the laser beam output from the beam expander 21 thereby to produce and display a Fourier transform image; and a light transmission unit 5 for focusing the Fourier transform image produced and displayed on the image display unit 1 on the pupil face A of the observer's eye 3 and for producing the original image on the retina 3a of the eye 3.

As regards the Fourier transform image, since all point light sources constituting different spatial frequency components are coherent, this Fourier transform image is, strictly speaking, not a Fourier transform image. In this embodiment, images including an image in the coherent state are generally called "Fourier transform images".

The light transmission unit 5 includes a lens 7 (focal distance: f1) and an eye lens 9 (focal distance: f2). A mask 11 is situated near the object-side focal position of the eye lens 9 (i.e. the image-side focal position of lens 7).

The image display unit 1 is situated at the object-side focal position of the lens 7, and the pupil face A of the observer's eye 3 is aligned at the image-side focal position of the eye lens 9.

As is shown in FIG. 4, the image display unit 1 comprises a first polarizer 23 for passing only a predetermined polarized component of the laser beam output from the beam expander 21 (see FIG. 3); a first liquid crystal (LC) element array 25 for changing the direction of polarization of the laser beam which has passed through the first polarizer 23; a second polarizer 27 for passing only a predetermined polarized component of the laser beam whose direction of polarization has been changed by the first LC element array 25; and a second LC element array 29 for varying the refractive index with respect to the polarized component which has been chosen by the second polarizer 27.

The first and second LC element arrays 25 and 29 are constructed such that their pixel positions and densities coincide.

A control unit 2 controls a voltage applied to the pixels (not shown) of the first LC element array 25, thereby changing the direction of polarization of the laser beam, which has been led to the pixels through the first polarizer 23, and pattern-controlling the amount of light passing through the second polarizer 27. As a result, the amount of light passing through the pixels, i.e. the amplitude of each frequency component, can be controlled.

On the other hand, the control unit 2 controls a voltage applied to the pixels (not shown) of the second LC element array 29, so that the birefringence of the LC element array 29 can be varied. By varying the birefringence, the refractive index with respect to the polarized component led to the pixels through the second polarizer 27 can be varied. As a result, the relative optical path lengths of the paired point light sources can be varied, and the phase of the sine-wave component produced on the retina 3a (see FIG. 3) can be controlled.

As has been described above, both the amplitude and phase of each frequency component can be controlled independently by the image display unit 1 according to this embodiment.

One Fourier spectrum is assigned to each of the pixels of the first and second LC element arrays 25 and 29. By gathering the Fourier spectra, a Fourier transform image of display pixels is produced and displayed. The spatial frequency and fringe direction of the sine-wave component produced on the retina 3a are expressed by the positions of the individual piexels of the LC element arrays 25 and 29. Further, pixels near the centers of the first and second LC element arrays 25 and 29 are assigned to the DC component at the center of the Fourier transform image. Thus, substantially equal spatial frequency components can be produced in all directions.

The Fourier transform image produced and displayed on the image display unit 1 is focused on the pupil face A of the observer's eye 3 via the light transmission unit 5 on the basis of the principle illustrated in FIG. 1. Thus, the original image is directly produced on the retina 3a.

The advantages of the image display apparatus according to this embodiment are the same as those of the above-described principle of the present invention, and therefore a description thereof is omitted.

An image display apparatus according to a second embodiment of the invention will now be described with reference to FIGS. 3 to 5.

The image display apparatus of the second embodiment differs from that of the first embodiment only in the structure of the image display unit 1 shown in FIG. 3, and the other structural features, operations and advantages are identical. Accordingly, only the image display unit 1 of the second embodiment will now be described.

As is shown in FIG. 5, the image display unit 1 according to the second embodiment comprises a first polarizer 31 for passing only a predetermined polarized component of the laser beam output from the beam expander 21 (see FIG. 3); a first liquid crystal (LC) element array 33 for changing the direction of polarization of the laser beam which has passed through the first polarizer 31; a second polarizer 35 for passing only a predetermined polarized component of the laser beam whose direction of polarization has been changed by the first LC element array 33; a second LC element array 37 for changing the direction of polarization of the laser beam which has passed through the second polarizer 35; a λ/4 plate 39 for providing a π/2 phase difference to the laser beam, whose direction of polarization has been changed by the second LC element array 37, in accordance with the polarized component; and a third polarizer 41 for passing only a predetermined polarized component of the laser beam which has been provided with a phase difference by the λ/4 plate 39.

The first and second LC element arrays 33 and 37 according to the second embodiment have functions of changing the direction of polarization of laser beam, with the voltage applied to the pixels being controlled by the control unit 2. These LC element arrays 33 and 37 are constructed such that the positions and densities of their pixels coincide.

According to this structure, the voltage applied to the pixels (not shown) of the first LC element array 33 is controlled by the control unit 2, and thereby the direction of polarization of the laser beam led to the pixels via the first polarizer 31 is changed and the pattern of the amount of light passing through the second polarizer 35 is controlled. As a result, the amount of transmission light of the pixels, i.e. the amplitude of each frequency component, can be controlled.

In the first embodiment, the optical path length of light passing through each pixel is varied to control the phase. On the other hand, in the second embodiment, the light led to the pixels of the second LC element array 37 via the second polarizer 35 is divided into components with a phase difference of π/2 (e.g. sine wave and cosine wave), and the ratio of amplitude therebetween is varied to control the phase.

Specifically, the λ/4 plate 39 is situated on the optical path between the second LC element array 37 and third polarizer 41, and the laser beam guided through the second LC element array 37 is provided with the phase difference of π/2 by the λ/4 plate 39.

Suppose that one of the crystal axes of the λ/4 plate 39 is an s-axis (an axis with a low light phase velocity), and the other of the crystal axes perpendicular to the s-axis is an f-axis (an axis with a high light phase velocity). If the amplitude of the laser beam guided through the second LC element array 37 is A, the s-axis component $A_s$ and f-axis component $A_f$ of the laser beam are expressed by $A_s = A\cos(\alpha)$ $A_f = A\sin(\alpha)$ where α=the angle defined by the direction of polarization of the laser beam guided through the second LC element array 37 and the s-axis direction of the λ/4 plate 39.

For the purpose of simplicity in description, it is supposed that the λ/4 plate 39 is situated with its s-axis made coincident with the direction of polarization of the laser beam output from the second polarizer 35. In general, it is not necessary to make the direction of the crystal axis of the λ/4 plate 39 with the direction of polarization of light output from the polarizer 35.

When the laser beam having the above characteristics passes through the λ/4 plate 39, a phase difference of π/2 is provided between the s-axis component $W_s$ and the f-axis component $W_f$ by the λ/4 plate 39.

In other words, if the angular frequency of light is ω and time is t, the s-axis component $W_s$ and f-axis component $W_f$ of light waves passing through the λ/4 plate 39 are given by $W_s = A_s \exp\{-i(\omega t)\}$
$\quad = A\cos(\alpha) \cdot \exp\{-i(\omega t)\}$
$W_f = A_f \exp[-i\{\omega t + (\pi/2)\}]$
$\quad = A\sin(\alpha) \cdot [-i\{\omega t + (\pi/2)\}]$ Further, only a predetermined polarized component of the laser beam having the above characteristics is passed through the third polarizer 41.

Specifically, the third polarizer 41 is situated such that its transmission axis has substantially equal angles with respect to the s-axis and f-axis of the λ/4 plate 39 (in this case, about 45° since it is supposed that the s-axis intersects the f-axis at right angles). The entire laser beam which has passed through the third polarizer 41 has about 45° polarized components with respect to the s-axis or f-axis of the λ/4 plate 39 and is coherent. Thus, the amplitude distribution thereof is expressed by $W = W_s + W_f = 2^{-1/2} A \exp\{-i(\omega t + \alpha)\}$ As is clear from this formula, the phase of the laser beam can be expressed by the polarization angle (the angle with respect to the s-axis λ/4 plate 39) and the phase of the laser beam can be controlled by applying a predetermined voltage to the second LC element array 37 via the control unit 2.

By performing the above control for each pixel of the second LC element array 37, the phase and amplitude of the Fourier transform image can be controlled independently.

In each of the above formulae, the loss of light in each element is considered. The advantage of the invention does not substantially change due to light loss. Even when the light loss amount varies depending on the polarized component, the influence of such variation can be eliminated by suitably selecting the direction of transmission axis of the third polarizer 41. In the present embodiment, since the first and second LC element arrays 33 and 37 of the same type are used, matching between the LC element arrays as an optical system, such as positioning of pixels of two LC element arrays, is easily effected.

Concepts of optical information processing can be applied to the image display apparatuses of the above embodiments, in order to easily provide the display images with various functions. For example, by supposing various mask patterns on the image display unit 1 (see FIG. 3), it becomes possible to exclude or extract a predetermined spatial frequency component or pattern. For example, by overlapping a circular opening on the center of the DC component, a function of a low-pass filter is realized, and as a result a band limit can be added. In addition, convolution can be made between other patterns. In this case, for example, the same image can be displayed in a multiple manner by overlapping a mask having a retinal point pattern.

The Fourier transform image produced and displayed by the image display unit 1 according to each of the above embodiments is obtained by using an image derived by computer processing from a computer-generated image or an image recorded on a film or magnetic (magneto-optic) recording medium by means of a camera or the like. However, it is possible to use a Fourier transform image produced directly by a computer or a Fourier transform image produced by optical means.

Further, in each of the above-described embodiments, the image display unit 1 is constructed such that it is illuminated by coherent light emitted from the laser 19 (see FIG. 3). It is also possible, however, to apply, e.g. incoherent light. In this case, it is necessary to pass the incoherent light through a spatial filter (not shown), thereby enhancing coherence.

Figure 6:
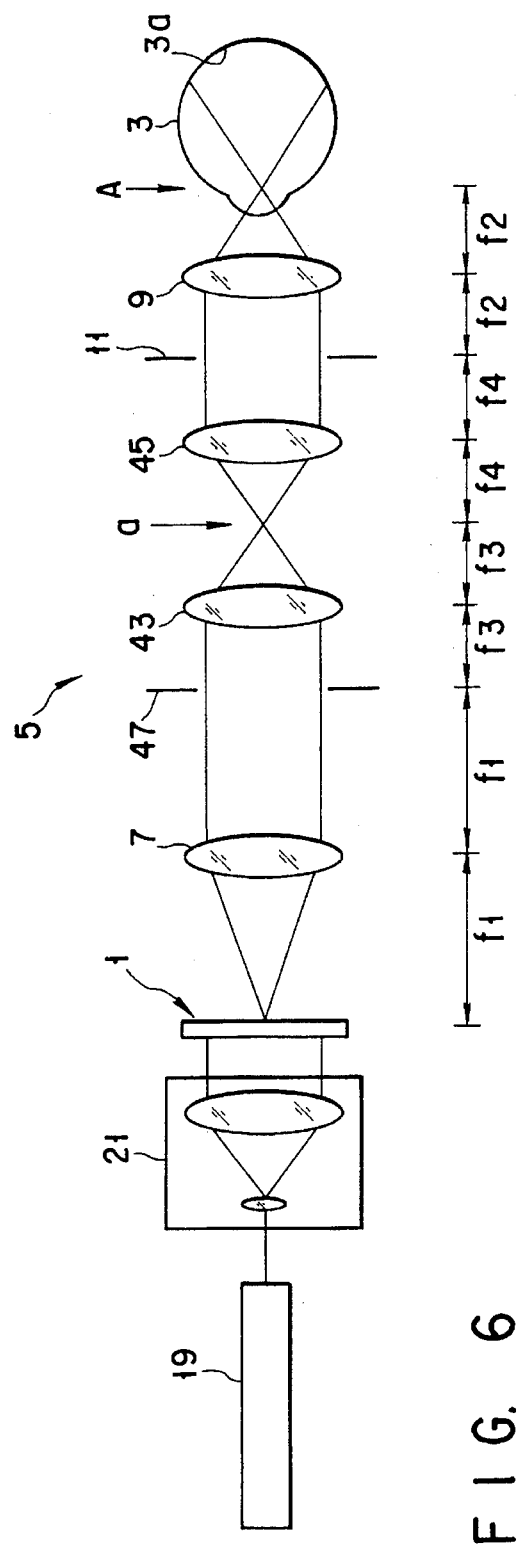
FIG. 6 shows a modification of the image display apparatus shown in FIG. 3.

FIG. 6 shows a modification of the image display apparatus according to each of the above embodiments. Specifically, a light transmission unit 5 comprises first and second lenses 43 and 45 provided on a light path between a lens 7 and an eye lens 9.

As is shown in FIG. 6, the first lens 43 (focal distance: f3) and second lens 45 (focal distance: f4) are arranged such that the image-side focal position of the first lens 43 and the object-side focal position of the second lens 45 coincide with each other. The object-side focal position of the first lens 43 coincides with the image-side focal position of the lens 7, and a mask 47 is provided in this position. The image-side focal position of the second lens 45 coincides with the object-side focal position of the eye lens 9, and another mask 11 is provided in this position.

In the image display apparatus according to the present modification, a position a (the image-side focal position of the first lens 43 or object-side focal position of the second lens 45) is conjugate with the image display unit 1 and the pupil A of the observer's eye 3. For example, when a mask (not shown) is provided in the conjugate position, the same advantage as in the case where the mask is situated on the image display unit 1 can be obtained, and various images can be displayed on the retina 3a by applying various characteristics of optical information processing.

As shown in the modification of the invention, the position a conjugated optically with the pupil face A of eye 3 and image display unit 1 can be newly produced each time the two lenses 43 and 45 are added. Thus, more complex image processing can be performed by producing many conjugate positions.

Furthermore, according to this modification, even if the pixel positions and densities of the first and second LC element arrays (see FIGS. 4 and 5) of the above embodiments are different, these arrays can be combined by suitably selecting the refractive powers of four lenses (7, 43, 45 and 9) and adjusting the magnification. In addition, even when the pixel faces of the two LC element arrays do not fall within the focal depth of the lens 7, focus can be effected on any pixel face by dividing these LC element arrays into an amplitude control portion and a phase control portion and by adjusitiqdng magnification with one of these portions situated at the object-side focal position of the eye lens 9.

In each of the above embodiments, the image display method using monochromatic light is employed. However, in order to obtain a color image, a Fourier transform image of an image of each of three or more monochromatic colors selected properly from the visible wavelength region may be produced and displayed by the first and second LC element arrays.

There are two methods of displaying such Fourier transform images: (1) a method in which the respective images are presented simultaneously and synthesized, and (2) a method in which the images are presented successively and synthesized.

In an example of the method (1), illumination systems and image display units (not shown) are provided individually for the respective wavelength portions. Images output from the image display units are synthesized by beam splitters, dichroic mirrors or the like, and the synthesized image is presented on the observer's eye by the same princple and method as shown in FIG. 1. In another example of the method (1), an LC element array having various color filters arranged so as to correspond to the respective pixels, and this array is illuminated by white light. In this case, sub-arrays are composed of pixels having filters of the same wavelength component, and Fourier transform images of corresponding wavelength components are produced by these sub-arrays.

In an example of the method (2), lasers having different wavelength outputs are combined, or shutters are provided for two or more kinds of laser light outputs such as white laser outputs. Thereby, wavelength is selected temporally and the image display unit is illuminated. In this case, the Fourier transform image of the corresponding wavelength component may be displayed in synchronism with the wavelength selection. In a similar example, elements such as two or more kinds of interference filters are successively inserted in an optical path including a white light lamp as a light source, and wavelength selection is effected. In synchronism with this, a Fourier transform image of the corresponding wavelength component is displayed by an image display unit. It is also possible to employ a method in which a deflector such as an acousto-optical modulation element is used and the frequency of an applied high frequency driving pulse is varied. Thereby, the diffraction angle is controlled and the diffraction light is passed through a pin hole or slit. Thus, wavelength selection is carried out. In each case, if two or more wavelength components are presented within a time period summed by the visual system, the obtained image is sensed as a color image.

An image display apparatus according to a third embodiment of the present invention will now be described with reference to FIG. 7. The same structural elements as in the first embodiment are denoted by like reference numerals, and a description thereof is omitted.

Figure 7:
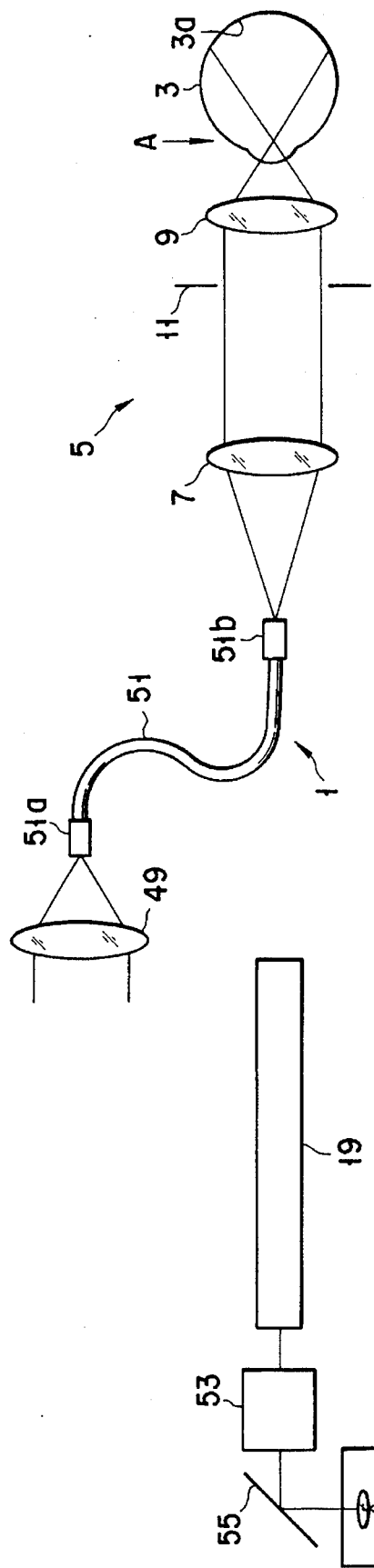
FIG. 7 shows schematically the structure of an image display apparatus according to a third embodiment of the invention.

As is shown in FIG. 7, in this image display apparatus, an optical fiber is applied as an image display unit. Specifically, an object or an image (not shown) illuminated by a white light source (not shown) is Fourier-transformed by a condensing lens 49 and then input to an input end 51a of an image fiber 51. The resultant image is guided to an output end 51b of the image fiber 51 and is output. A Fourier-transformed image is produced and displayed by the point light source output at this time.

The thus produced and displayed Fourier-transformed image is guided to the pupil face A of the observer's eye 3 via the above-mentioned light transmission unit 5. As a result, a wide-image-angle, high-fine original image is produced on the retina 3a.

When the light transmission from the input of image to the production of the original image on the retina 3a is performed optically, the original image can be produced on the retina 3a even if no special consideration is given to the coherence of illumination light or the information on amplitude and phase of each point light source.

An image display apparatus according to a fourth embodiment of the invention will now be described with reference to FIG. 8. The same structural elements as in the first embodiment (see FIG. 3) are denoted by like reference numerals, and a description thereof is omitted.

Figure 8:
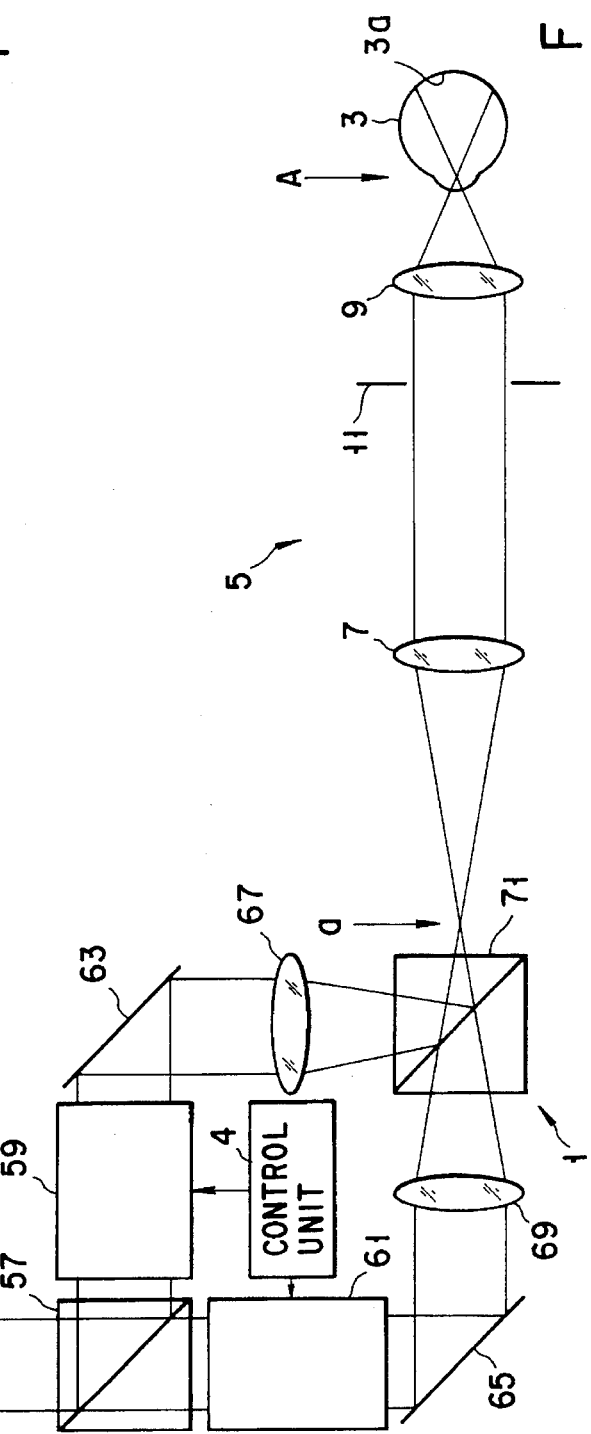
FIG. 8 shows schematically the structure of an image display apparatus according to a fourth embodiment of the invention.

As is shown in FIG. 8, in this image display apparatus, the light intensity of a laser beam emitted from a laser 19 is attenuated to a predetermined value through an opitcal attenuator 53. Then, the intensity-attenuated beam is reflected by a reflection mirror 55 and radiated on a beam expander 21.

A laser beam enlarged to a parallel beam via the beam expander 21 is divided into two portions in two directions via a first beam splitter 57 and guided to associated first and second 2nd-order acousto-optical modulators.

The first and second 2nd-order acousto-optical modulators 59 and 61 subject the laser beams to predetermined modulation and output diffraction beams.

The diffraction beams output from the first and second 2nd-order acousto-optical modulators 59 and 61 are reflected by associated first and second plane mirrors 63 and 65, passed through first and second lenses 67 and 69, and made incident on a second beam splitter 71. In the second beam splitter 71, the beams are combined.

The light emitted from the first and second 2nd-order acousto-optical modulators 59 and 61 includes non-diffraction light (i.e. 0-th order diffraction light) and diffraction light. In this embodiment, the first and second flat mirrors 63 and 65, the first and second lenses 67 and 69 and the second beam splitter 71 are arranged so as to guide only the 1st-order diffraction light to the observer's eye 3 via the aforementioned optical system.

At this time, the diffraction angles of the diffraction beams output from the first and second 2nd-order acousto-optical modulators 59 and 61 depend on the frequency of high-frequency driving pulses applied to the modulators 59 and 61 by a control unit 4. By the two-dimensional combination of the frequencies, the spatial frequency of interference fringe formed on the retina 3a and the direction of the fringe can be controlled.

The diffraction angles of the diffraction beams output from the first and second 2nd-order acousto-optical modulators 59 and 61 are controlled so as to be rotational-symmetric with respec to the optical axis (i.e. DC component). As a result, a Fourier-transform image is produced and presented by a pair of Fourier spectra at an image-side focal plane (indicated by a in FIG. 8) of the first and second lenses 67 and 69.

The thus produced and presented Fourier transform image is guided to the pupil face A of the observer's eye 3 via a light transmission unit 5. Thus, a wide-image-angle, high-fine original image is produced on the retina 3a.

The object-side focal planes of the first and second lenses 67 and 69 coincide with the diffraction planes of the first and second acousto-optical modulators 59 and 61. The image-side focal planes of the first and second lenses 67 and 69 coincide with the object-side focal plane of the lens 7 of the light transmission unit 5.

In this embodiment, the amplitude (intensity) of each spatial frequency component is controlled by the optical attenuator 53 in synchronism with the time the diffraction angle (spatial frequency and direction of fringe) are set by the high-frequency driving pulses applied to the first and second 2nd-order acousto-optical modulators 59 and 61.

The phase of the interference fringe formed on the retina 3a is controlled by varying the relative phases of the high-frequency driving pulses applied to the first and second 2nd-order acousto-optical modulators 59 and 61 and delaying the time needed for light to reach the retina 3a.

As described above, in the image display apparatus of this embodiment, only one kind of spatial frequency component is output at a time. However, the original image can be reproduced by producing and displaying an interference fringe having various frequency components necessary for describing the image, on the basis of temporal aggregate characteristics of information in the human visual mechanism.

The first and second 2nd-order acousto-optical modulators 59 and 61 may be not used. In this case, for example, the first and second flat mirrors 63 and 65 are rotated two-dimensionally and the Fourier transform image is produced and displayed on the plane indicated by a.

It is also possible to produce and display the Fourier transform image at the plane indicated by a, by situating a one-dimensionally arranged LC element array (or a simple semiconductor laser array) just in front of the first beam splitter 57 and rotating the first and second flat mirrors 63 and 65 one-dimensionally in a direction perpendicular to the direction of arrangement of the array. In this case, the amplitude component of the Fourier-transform image is expressed by controlling the transmission light distribution (or luminance) of the one-dimensionally arranged LC element array (or semiconductor laser array) in synchronism with the rotation of the first and second flat mirrors 63 and 65.

In this modification, in a desired method of controlling the phase component of the Fourier-transform image, for example, means for varying the optical path length, as shown in the first embodiment, is situated in either or both optical paths between the first and second beam splitters 57 and 71.

Furthermore, in this embodiment, in order to obtain a color image, like the above-described embodiments, a light source having three or more kinds of wavelength components selected suitably from among visible wavelength region is used, and Fourier-transform image patterns of each wavelength component are produced by the 2nd-order acousto-optical modulators. Then, the produced Fourier-transform image patterns are synthesized simultaneously or successively.

An image display apparatus according to a fifth embodiment of the invention will now be described with reference to FIGS. 9 to 11. The same structural elements as in the first embodiment (see FIG. 3) are denoted by like reference numerals, and a description thereof is omitted.

Figure 9:
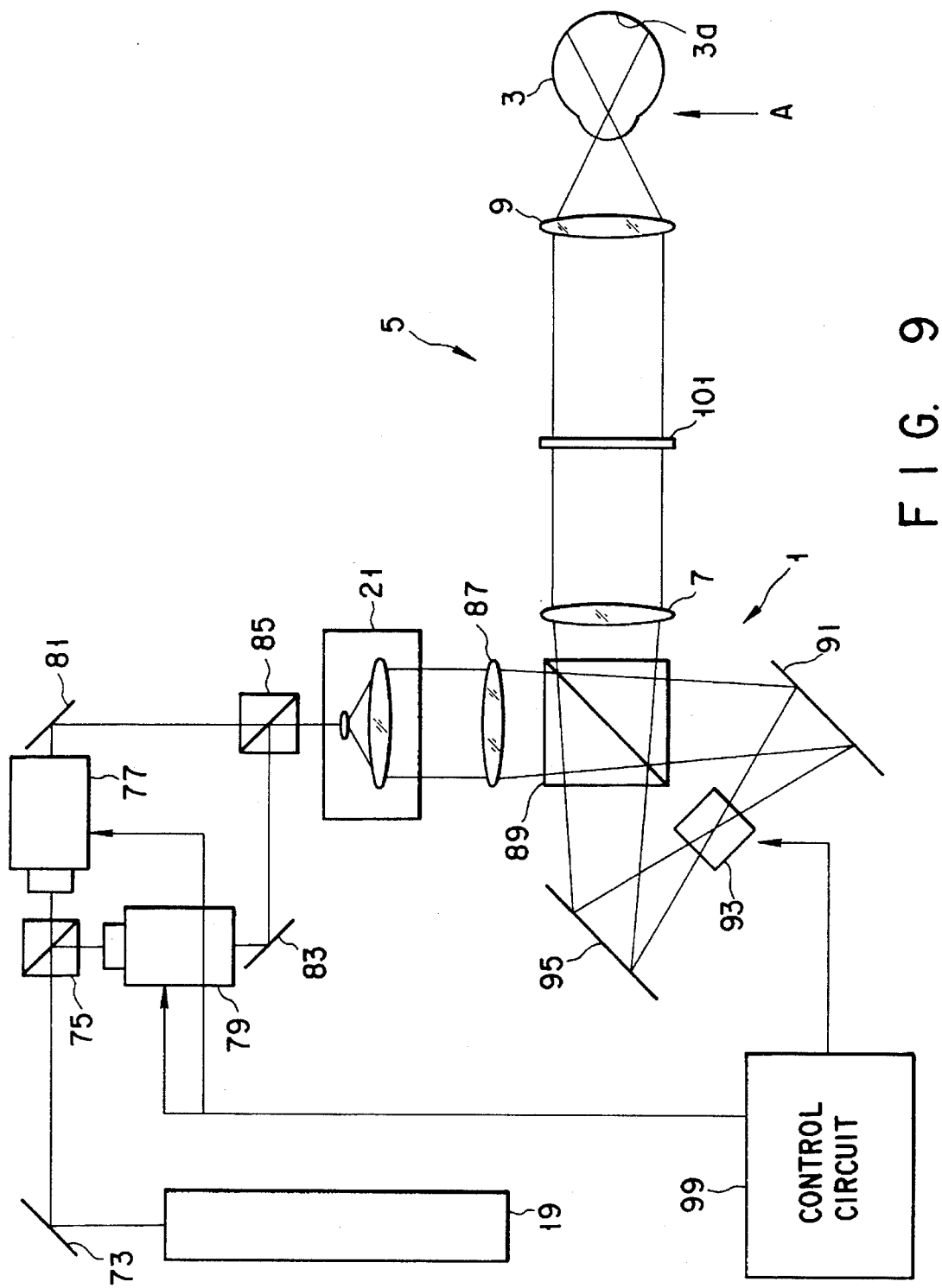
FIG. 9 shows schematically the structure of an image display apparatus according to a fifth embodiment of the invention.

As is shown in FIG. 9, in this image display apparatus, a laser beam emitted from a laser 19 is reflected by a first reflection mirror 73 and then radiated on a first polarizing beam splitter 75. The beam incident on the polarizing beam splitter 75 is divided in two directions according to the polarized components.

Specifically, a P-polarized component of the laser beam passes through the first polarizing beam splitter 75 and reaches a first acousto-optical modulator 77. On the other hand, an S-polarized component of the laser beam is reflected by the first polarizing beam splitter 75 and then led to a second acousto-optical modulator 79.

These first and second acousto-optical modulators 77 and 79 have functions of subjecting the laser beams to predetermined modulation and outputting diffraction light.

The diffraction light output from the first and second acousto-optical modulators 77 and 79 is reflected by associated second and third reflection mirrors 81 and 83 and radiated on a second polarizing beam splitter 85.

The P-polarized component passes through the second polarizing beam splitter 85 and the S-polarized component is reflected by the second polarizing beam splitter 85. Thus, the two laser beams radiated on the second polarizing beam splitter 85 are optically coupled.

The fifth embodiment differs from the fourth embodiment in that the frequencies of high-frequency driving pulses applied to the first and second acousto-optical modulators 77 and 79 are kept constant.

Thus, the functions of the first and second acousto-optical modulators 77 and 79 according to the fifth embodiment are to vary the relative phases of high-frequency pulses applied to both first and second acousto-optical modulators 77 and 79 and to delay the time needed for the laser beams to reach the retina 3a, thereby controlling the phase of the interference fringe produced on the retina 3a.

The optically coupled laser beam produced via the second polarizing beam splitter 85 is radiated on a beam expander 21. The laser beam enlarged to a parallel beam by the beam expander 21 is radiated on a third polarizing beam splitter 89 via a lens 87. In the third beam splitter 89, the parallel beam is divided in two directions once again.

Specifically, the P-polarized component, which has passed through the first polarizing beam splitter 75, passes through the third polarizing beam splitter 89, and then it returns to the third polarizing beam splitter 89 via a first flat mirror 91, an optical member 93 and a second flat mirror 95. On the other hand, the S-polarized component, which has been reflected by the first polarizing beam splitter 75, is reflected by the third polarizing beam splitter 89 and then it returns to the third polarizing beam splitter 89 via the second flat mirror 95, optical member 93 and first flat mirror 91.

As a result, in the third polarizing beam splitter 89, the P-polarized component and S-polarized component are optically coupled. The laser beam having the optically coupled P- and S-polarized components is led to the observer's eye 3 via the light transmission unit 5.

The image-side focal position of the lens 87 (i.e. the center position of the optical member 93) coincides with the object-side focal position of the lens (e.g. collimator lens) 7.

The two laser beams passing through the optical member 93 are incident on the optical member 93 in opposite directions along the optical axis, as shown in FIG. 10. Thus, by inclining the optical member 93 (e.g. glass plate or glass cube) with respect to the optical axis, the two laser beams are shifted symmetrically with respect to the optical axis.

As a result, by rotating the optical member 93, a pair of point light sources (not shown) arranged symmetrically with respect to the optical axis are produced on the pupil face A of the eye 3. These light sources become a pair of Fourier spectra. The spectra having various spatial frequencies and directions of fringe are synthesized, and a Fourier transform image is produced and displayed on the retina 3a.

As is shown in FIG. 11, the control of spatial frequencies and directions of fringe is effected by rotating the optical member 93 about two kinds of rotational axes (which intersect with each other at right angles).

FIG. 11A shows a method for rotating the optical member 93 about two rotational axes X and Y intersecting with each other at right angles. In this case, the spatial frequencies and directions of fringe to be formed on the retina 3a (see FIG. 9) are expressed on the basis of vectors by the combinations of two kinds of rotation. On the other hand, FIG. 11B shows a method for rotating the optical member 93 about the optical axis 97 and rotational axis X. In this case, the direction of fringe is controlled by rotating the optical member 93 about the optical axis 97, and the spatial frequency is controlled by rotating the optical member 93 about the rotational axis x.

Driving means such as varous motors or galvanometers may be used for rotational control of the optical member 93.

Specifically, while the optical member 93 is being rotated, the spatial frequency and direction of fringe are determined with the laser beam shut by a shutter (not shown), etc. Based on the determined values, the relative phases of high-frequency pulses applied to the first and second acousto-optical modulators 77 and 79 are set. At this time, the shutter is opened. Then, the shutter is closed once again, and the next spatial frequency and direction of fringe are determined.

These operations are repeatedly controlled by a control circuit 99 (see FIG. 9), thereby forming a Fourier-transform image.

The Fourier-transform image is guided to the pupil face A of the observer's eye 3 via the light transmission unit 5. As a result, a wide-image-angle, high-fine original image is produced on the retina 3a.

The P-polarized component and S-polarized component have mutually perpendicular directions of polarization, and no mutual interference occurs. Thus, it is desirable to arrange a polarizing element 101 in the optical path between the third polarizing beam splitter 89 and the eye 3.

As has been described above, in the image display apparatus of this embodiment, only one kind of spatial frequency component is output at a time,. However, on the basis of the temporal information gathering characteristics of the human visual mechanism, the optical member 93 is rotated and an interference fringe having various frequency components necessary for describing an image can be produced an displayed, and the original image can be reproduced.

Furthermore, in this embodiment, in the case of obtaining a color image, light sources having three or more kinds of wavelength components selected suitably from among visible wavelength regions are used, and Fourier transform patterns corresponding to the respective wavelength components are produced by controlling the rotation of the optical member 93. The produced Fourier-transform image patterns are synthesized simultaneously or successively.

Next, an image display apparatus according to a sixth embodiment of the present invention will now be described with reference to FIGS. 12 and 13. In the following description of the sixth embodiment, the same structural elements as in the first embodiment (see FIG. 3) are denoted by like reference numerals and a description thereof is omitted.

As is shown in FIG. 12, the image display apparatus of the sixth embodiment comprises a laser array 103 and image-rotating means 107 in an image display unit.

Like a semiconductor laser array, for example, the laser array 103 serving as a light source comprises two-dimensionally arranged laser elements (not shown). Of the laser elements, the same laser element emits a coherent light beam, and different laser elements emit mutually incoherent light beams.

As is shown in FIG. 12, a light beam emitted from the laser array 103 is divided in two directions by a first beam splitter 105.

One of the divided light beams is reflected by the first beam splitter 105, and, after rotated by the image-rotating means 107 over 180°, it is radiated on a second beam splitter 111 via a first reflection mirror 109. The other of the divided beams passes through the first beam splitter 105 and then this beam is reflected by the second reflection mirror 113 and radiated on the second beam splitter 111.

At this time, when it is necessary to equally adjust the amounts of the two light beams radiated on the second beam splitter 111, it is desirable to arrange, e.g. a density filter, a color filter or filter 115 of polarizer, etc. in a light path between the second reflection mirror 113 and the second beam splitter 111.

As is shown in FIG. 13, the image-rotating means 107 is constituted by a combination of first and second prisms 107a and 107b, for example, as shown in FIG. 13. The image-rotating means 107 has a function of an image 117 (indicated by an arrow) about the optical axis over 180° and outputting the resultant image.

The two beams radiated on the second beam splitter 111 are optically coupled such that these beams are adjacent to each other with respect to the optical axis, and the coupled beam is guided to a phase conversion element array 119. Specifically, these two light beams are guided to the phase conversion element array 119 in the state in which these beams are rotationally symmetrical with respect to the optical axis (i.e. DC component).

The phase conversion element array 119 is constructed so as to have the same pixel positions and pixel densities as those of the laser array 103, and the array 119 functions as the aforementioned image display unit.

As a result, a pair of Fourier spectra are formed on the phase coversion element array 119. Such Fourier spectra are gathered to produce and display a Fourier-transform image.

The Fourier-transform image produced and displayed on the phase conversion element array 119 is is guided to the pupil face A of the observer's eye 3 via the light transmission unit 5. Thus, a wide-image-angle, high-fine original image is produced on the retina 3a.

As has been described above, according to the image display apparatus of this embodiment, interference fringes having various spatial frequency components necessary for describing an image can be simultaneously formed, and therefore a retinal image can be produced and displayed in a short time.

Furthermore, in this embodiment, in the case of obtaining a color image, light sources having three or more kinds of wavelength components selected suitably from among visible wavelength regions are used, and Fourier transform patterns corresponding to the respective wavelength components are produced by the laser array 103. The produced Fourier-transform image patterns are synthesized simultaneously or successively.

The present invention is not limited to the structure of the above embodiments, and various modifications may be made. For example, the phase conversion element array 119 may be replaced by an LC element array having birefringence which can be controlled by controlling an applied voltage. Alternatively, the LC element array, λ/4 plate and polarizer, described in the second embodiment (see FIG. 5), may be combined.

An amplitude component of each of the aforementioend pair of Fourier spectra can be produced by modulating the amplitude (or luminance) of the light beam emitted from the laser array 103.

Besides, the LC element array (see FIGS. 4 and 5) having the same pixel positions and pixel densities as the laser array 103 may be situated near the phase conversion element array 119, and the transmissivities of the LC elements constituting the LC element array may be controlled, whereby the amplitude component of each of the aforementioned Fourier spectra can be produced.

An image display apparatus according to a seventh embodiment of the invention will now be described with reference to FIGS. 14 and 15. In the following description of the seventh embodiment, the same structural elements as in the first embodiment (see FIG. 3) are denoted by like reference numerals and a description thereof is omitted.

The image display apparatus according to this embodiment is characterized by comprising a prism 125 in the image display unit. Specifically, the prism 125 is situated in a light path between a point light source $S_0$ (described later) and a lens 7 (focal distance: $f_1$). The point light source $S_0$ is provided at the object-side focal position of the lens 7.

As is shown in FIG. 14, coherent light emitted from a light source 121 forms the point light source $S_0$ through a condensing lens 123, and then the light is made incident on the prism 125.

The prism 125 has a shape having an equilateral-triangular cross-section with a light-incidence surface as a bottom side. The coherent light incident on the prism 125 via the point light source $S_0$ is emitted from the prism 125 as if it were emitted from a pair of point light sources $S_1$ and $S_2$.

The pair of point light sources $S_1$ and $S_2$ are also formed on the object-side focal position of the lens 7, such that these point light sources are symmetrical with respect to the point light source $S_0$.

Images of point light sources $S_1$ and $S_2$ output from the prism 125 are guided to the pupil face A of the observer's eye 3 via the light transmission unit 5. As a result, a wide-image-angle, high-fine original image is formed on the retina 3a.

In the image display apparatus according to this embodiment, the spatial frequency of the interference fringe formed on the retina is proportional to the distance d between the pair of point light sources $S_1$ and $S_2$. This distance d can be approximately expressed by:

$$d=2(n-1)\phi L,$$

L: the distance between the prism 125 and point light source $S_0$, n: the refractive index of material constituting the prism, and $\phi$: the bottom angle of the prism 125.

Accordingly, the prism 125 is moved along the optical axis by means of the control unit 6, whereby the distance d between the pair of point light sources $S_1$ and $S_2$, i.e. the spatial frequency of the interference fringe, can be controlled.

The direction of interference fringe can be chosen by rotating the prism 125 about the optical axis by means of the control unit 6.

Furthermore, the phase information of the interference fringe can be controlled by moving the prism 125 by means of the control unit 6 by a slight amount in the direction of arrow S. In this case, since the image positions of the two point light sources $S_1$ and $S_2$ produced on the pupil face A of the eye 3 are displaced by a slight amount, the phase of the interference fringe formed on the retina 3a varies in accordance with the amount of displacement.

The image positions of the two point light sources $S_1$ and $S_2$ produced on the pupil face A of the eye 3 can be similarly displaced by a slight amount by rotating the optical member (e.g. glass) 127 situated in the light path between the lens 7 and mask 11 in the direction of arrow T by means of the control unit 8.

In FIG. 15, an optical member 127 is shown such that it can rotate only in the direction of a double-headed arrow T. For example, as shown in FIG. 11, the optical member 127 may be constructed so as to be rotatable about axes which are perpendicular to each other, and thereby the phase information of interference fringe in any direction can be controlled.

Next, a method of controlling the spatial frequency of the interference fringe, the direction of fringe and phase information will now be described.

The prism 125, as shown in FIGS. 14 and 15, is constantly rotated by the control unit 6 (8) having a motor, etc. Thus, the rotational angle is always monitored by a rotary encoder (not shown).

When the rotational angle of the prism 125 has reached a predetermined value, the prism 125 is moved by the control unit 6 along the optical axis and rotated about the optical axis. As a result, the spatial frequency of the interference fringe and the direction of fringe are determined. At the same time, the phase information of the interference fringe is set by slightly moving the prism 125 in the direction of arrow S (see FIG. 14) or by rotating the optical member 127 (see FIG. 15) in the direction of arrow T by means of the control unit 8.

When the spatial frequency and direction of fringe have been set, a shutter (not shown) situated at the point light source $S_0$ is opened for a predetermined time period.

At this time, a pair of Fourier spectra are produced by repeating the above series of operations, a Fourier-transform image is produced.

As has been described above, in the image display apparatus of the present embodiment, only one kind of spatial frequency component is output at a time. However, on the basis of the temporal information gathering characteristics of the human visual mechanism, the position of the prism 125 can be controlled by the control unit 6, and an interference fringe having various frequency components necessary for describing an image can be produced an displayed, and the original image can be reproduced.

Furthermore, in this embodiment, in the case of obtaining a color image, light sources having three or more kinds of wavelength components selected suitably from among visible wavelength regions are used, and Fourier transform patterns corresponding to the respective wavelength components are produced by controlling the position of the prism 125. The produced Fourier-transform image patterns are synthesized simultaneously or successively.

Next, an image display apparatus according to an eighth embodiment of the present invention will now be described with reference to FIGS. 16 and 17. In the following description of the eighth embodiment, the same structural elements as in the sixth embodiment (see FIG. 12) are denoted by like reference numerals and a description thereof is omitted.

In the image display apparatus of this embodiment, in order to produce a high-fine retina image without degrading the image quality, a density filter 129 is situated in the light path between a second beam splitter 111 and a phase conversion element array 119.

When various ambient scenes are captured as an image and the image is subjected to Fourier-conversion calculation, the following relationship (exponential function) is established between the amplitude a and spatial frequency f:

$$a = f^P$$

It is known that the value of P is about −1.0. The details thereof are disclosed, for example, in "G. J. Burton and I. R. Moorhead, Applied Optics, vol. 26, PP. 157–170, 1987; D. J. Tolhurst, Y. Tadmor, and T. Chao, Ophthalmic and Physiological Optics, vol. 12, pp. 229–232."

In the image display apparatus of the present embodiment, in order to describe the amplitude of a high spatial frequency component, as well as that of other frequency components, with equal accuracy, the density filter 129 (see FIG. 16) having a predetermined transmissivity distribution (see FIG. 17) is applied to the image display unit.

Figure 17:
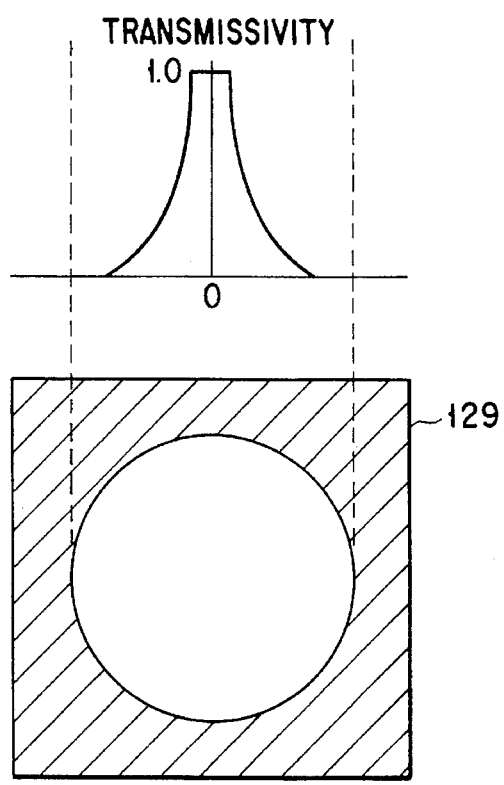
FIG. 17 shows a distribution of transmissivity of a density filter applied to the apparatus in FIG. 16.

As is shown in FIG. 17, the density filter 129 applied to the present embodiment has a highest transmissivity at its center portion, and the transmissivty of the filter 129 decreases towards the periphery on the basis of the aforementioned exponential function.

It is desirable that the value of P of the aforementioned exponential function be about −0.1, but it is preferable to select the value matching with the image to be displayed or the purpose of use.

As is shown in FIG. 16, the density filter 129 is situated near the phase conversion element array 119 which produces a Fourier-transform image. That part of the filter 129, which has a highest transmissivity agrees with the optical axis (i.e. DC component).

In the case of using a filter whose transmissivity can be expressed by about an inverse number of a spatial frequency, it is necessary to inversely convert, in advance, the Fourier-transform image produced and displayed by the laser array 103 (or LC element array applied to the first embodiment (see FIG. 3)) on the basis of a transmissivity function of the density filter 129. Specifically, the amplitude value of each Fourier spectrum needs to be divided by the value of transmissivity corresponding to the spatial frequency thereof.

As a result, the amplitude component of any of spatial frequency components can be described with substantially equal accuracy, and a high-fine retinal image can be produced without degrading the image quality.

When the LC element array (see FIG. 3) is used as an image display element, as in the first embodiment, it is difficult to eliminate leak light leaking from each pixel. In particular, when the amplitude component is small, the influence thereof cannot be ignored. By contrast, by using the density filter 129 of the present embodiment, the ratio of leak light relating to all displayed spatial frequency components can be limited to the same level.

According to the apparatus of the present embodiment, the amount of leak light can be reduced totally, and therefore a degradation in image contrast can be decreased or prevented.

As regards the object to describe all spectra with subtantially equal accuracy, the same advantage can be obtained, in some cases, without using the density filter 129. For example, in the first embodiment, when the beam expander 21 (see FIG. 3) is constituted by a objective lens for microscopes, a pinhole, and a collimator lens, an ojbective lens and a relatively large-diameter pinhole may be combined or a collimator lens with a short focal distance may be used, whereby the LC element array can be irradiated by illumination light having a Gauss distribution with a sharp luminance variation.

As a result, the amount of light of a peripheral portion of the illumination light (a portion corresponding to a high-frequency component) can be set to be lower than the amount of light of a center portion thereof (a portion corresponding to a low-frequency component). In this way, the same advantage as in the case of using the density filter 129 can be obtained by providing the illumination light itself with a luminance distribution.

An image display apparatus according to a ninth embodiment of the invention will now be described with reference to FIGS. 16 and 18. In the following description of the ninth embodiment, the same structural elements as in the eighth embodiment (see FIG. 12) are denoted by like reference numerals and a description thereof is omitted.

The image display apparatus of this embodiment is characterized by comprising means for efficiently displaying images on the basis of the human visual characteristics.

In general, a number of visual cells are arranged on the retina of the human eye, and external light reaching the retina via the optical system of the eye is sampled by these visual cells. In other words, the array of visual cells functions as a kind of sensor array.

Accordingly, like the sensor array such as a CCD array, aliasing occurs when a spatial frequency component exceeding a half frequency (Nyquist frequency) of the sampling frequency of each array is input. For example, a frequency component lower than the input frequency may occur, as in a moire phenomenon.

In normal life, such a high-frequency component is attenuated by the optical system of the eye and is hardly sensed. However, as in the above-described image display apparatus of the embodiment, when an image is produced directly on the retina by bypassing the optical system of the eye, the quality of the produced retinal image is degraded.

Figure 18A:
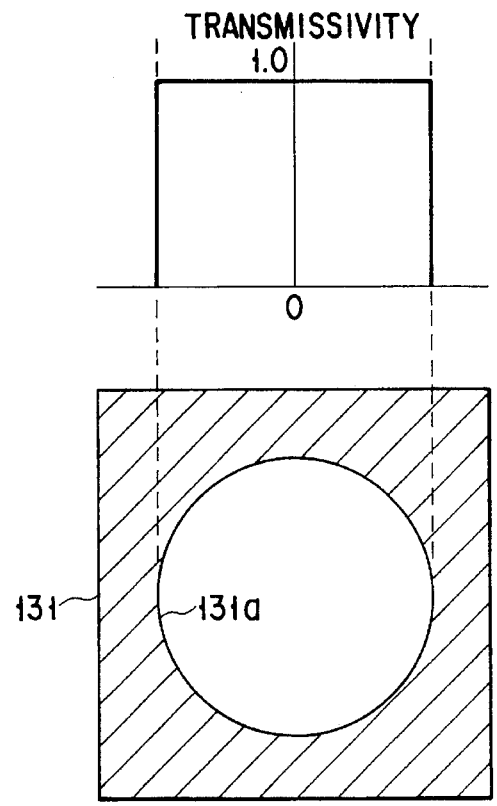
FIGS. 18A, 18B and 18C show schematically the structures of filters applied to an image display apparatus according to a ninth embodiment of the invention.

According to one method for solving this problem, as shown in FIG. 16, for example, a filter 131 having a circular opening 131a as shown in FIG. 18A (the filter 131 having a constant transmissivity over the entire circular opening 131a) is situated at or near a location where the Fourier-transform image is produced within the image display apparatus. Thereby, a spatial frequency component exceeding a Nyquist frequency can be eliminated.

The problem of aliasing occurs similarly in the case of producing a color image. In general, it is known that even in a visible wavelength region the spatial resolution of the visual mechanism with respect to light of short-wave regions sensed as purple or blue lowers, compared to the spatial resolution relating to other wavelengths (e.g. middle-wavelength region or long-wavelength regions).

The reason for this is that among the visual cells on the retina of the eye, the number of visual cells (hereinafter referred to as "short-wavelength sensitive cones) which are sensitive to light of short-wavelength regions is much less than that of visual cells sensitive to light of other wavelength regions, and that the short-wavelength sensitive cones are arranged on the retina very roughly.

Accordingly, when light of short-wavelength having a frequency component exceeding the spatial resolution of short-wavelength sensitive cones reaches, the aliasing may occur.

In the normal life, the aforementioned spatial frequency component is removed by color aberration of the optical system of the eye, and it does not reach the retina. However, in the case where an image is formed directly on the retina via the optical system of the eye, as in the image display apparatus of the above embodiment, the quality of the produced retinal image may be degraded.

According to one method for solving this problem, for example, the filter 131 as shown in FIG. 18A is situated at or near a location where the Fourier-transform image relating to short-wavelength light is produced within the image display apparatus. Thereby, a spatial frequency component exceeding a Nyquist frequency can be eliminated.

In this case, it is necessary to use the filter 131 having a smaller circular opening than the filter for middle- and long-wavelength regions, in consideration of the spatial resolution of the visual mechanism relating to short-wavelength light.

In addition, it is known that the human visual mechanism has a lower resolution in an oblique direction than in a horizontal or vertical direction.

Figure 18B:
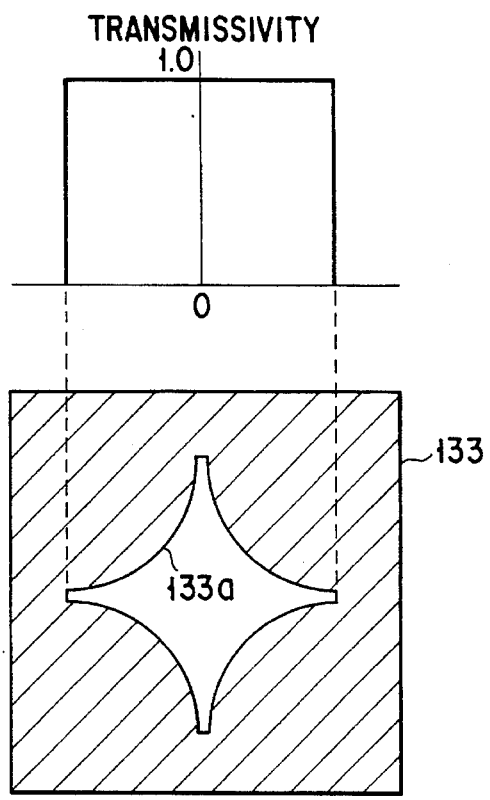

Thus, in the present embodiment, a filter 133 having an opening 133a as shown in FIG. 18B (this filter 133 having a constant transmissivity over the entire opening 133a) is used, so that the cut-off frequency in the oblique direction may lower.

As has been described above, in the image display apparatus of the present embodiment, the filters 131 and 133 are used on the basis of the human visual characteristics, and thereby a spectrum component with low visual effect is removed and the Fourier-transform image can be produced and displayed within a minimum necessary frequency range. Specifically, according to this embodiment, since the amount of frequency data can be reduced, the efficiency of image display can be enhanced.

Furthermore, since light can be radiated on a desired portion along of the phase conversion element array 119 by using the aforementioned density filter 129, the amount of leak light from the array 119 can be reduced. As a result, the image contrast can be enhanced.

Figure 18C:
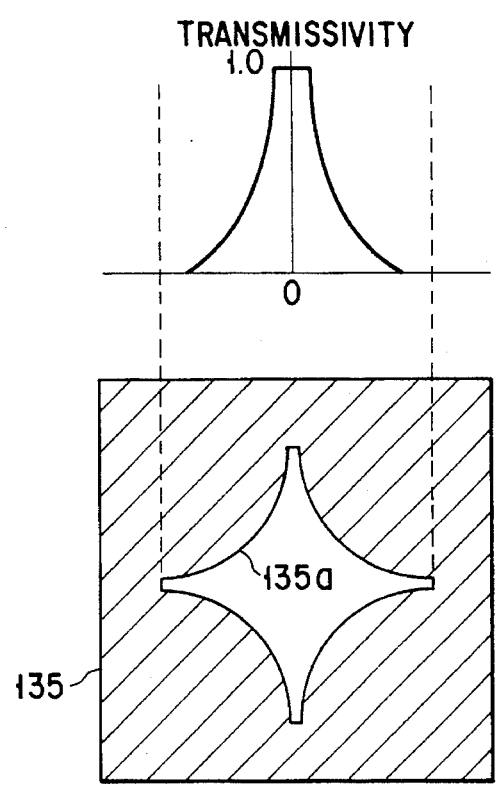

FIG. 18C shows the structure of a filter 135 constituted by combining the filter 133 (see FIG. 18B) and the density filter 129 (see FIG. 17) (the filter 135 is constructed such that the transmissivity of a center area of the opening is highest, and it decreases towards the periphery).

By using the filter 135, amplitude components of all spatial frequency components can be described with substantially equal accuracy, and at the same time, the resolution of the visual mechanism can be enhanced. Like each of the aforementioned filters, the filter 135 is situated near the phase conversion element array 119 where the Fourier-transform image is produced.

An image display apparatus according to a tenth embodiment of the present invention will now be described with reference to FIGS. 19 and 20. In the following description of the tenth embodiment, the same structural elements as in the first embodiment are denoted by like reference numerals and a description thereof is omitted.

Figure 20:
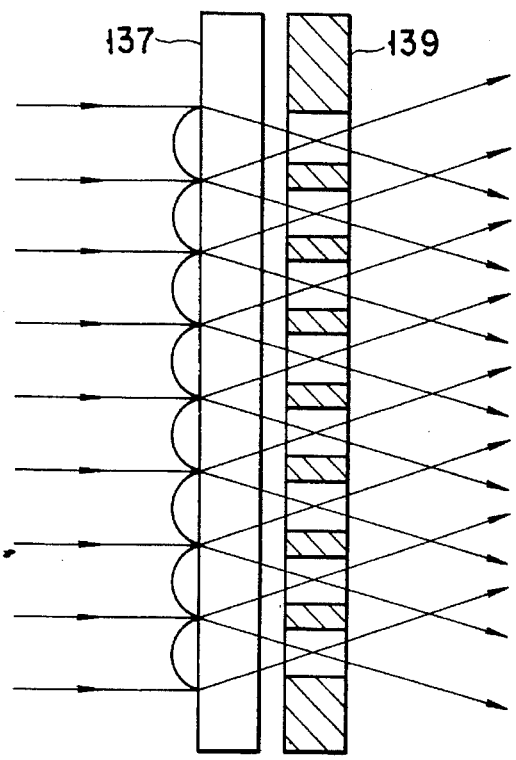
FIG. 20 shows the structures of a micro-lens array and a liquid crystal (LC) element array applied to the apparatus in FIG. 19.

As is shown in FIGS. 19 and 20, the image display apparatus of this embodiment is characterized by comprising a micro-lens array 137 and an LC element array 139 in the image display unit.

As is shown in FIG. 19, a laser beam emitted from a laser 19 is expanded by a beam expander 21 and converted to a parallel beam. The parallel beam is radiated on the LC element array 139 via the micro-lens array 137.

As is shown in FIG. 20, the micro-lens array 137 is constituted such that the lens position and lens density thereof agree with the pixel position and pixel density of the LC element array 139.

Further, the micro-lens array 137 and LC element array 139 are alinged with each other such that light incident on each micro-lens of the micro-lens array 137 is focused near the center of each pixel of the LC element array 139.

In the first and second embodiments, the image angle of the retinal image is determined by diffraction light diffracted by each pixel of the LC element array. Accordingly, in order to obtain a wide image angle, it is necessary to use an LC element array having small pixels or a high pixel density.

By contrast, according to the present embodiment, the image angle of the retinal image is determined by the angular aperture of each micro-lens. Thus, the size of the pixel of the LC element array 139 is not limited. Even if an LC element array 139 having a low pixel density is used, a wide-image-angle retinal image can be produced.

In addition, since a light-shield material is provided between pixels of a general LC element array, the light radiated thereto is absorbed or reflected.

By contrast, in the present embodiment, the light absorbed or reflected is collected by a micro-lens array 137 and radiated on the LC element array 139.

Accordingly, each pixel of the LC element array 139 can be efficiently irradiated. That is, the light from the ligth source can be effectively utilized.

An image display apparatus according to an eleventh embodiment of the present invention will be described with reference to FIG. 21.

Figure 21:
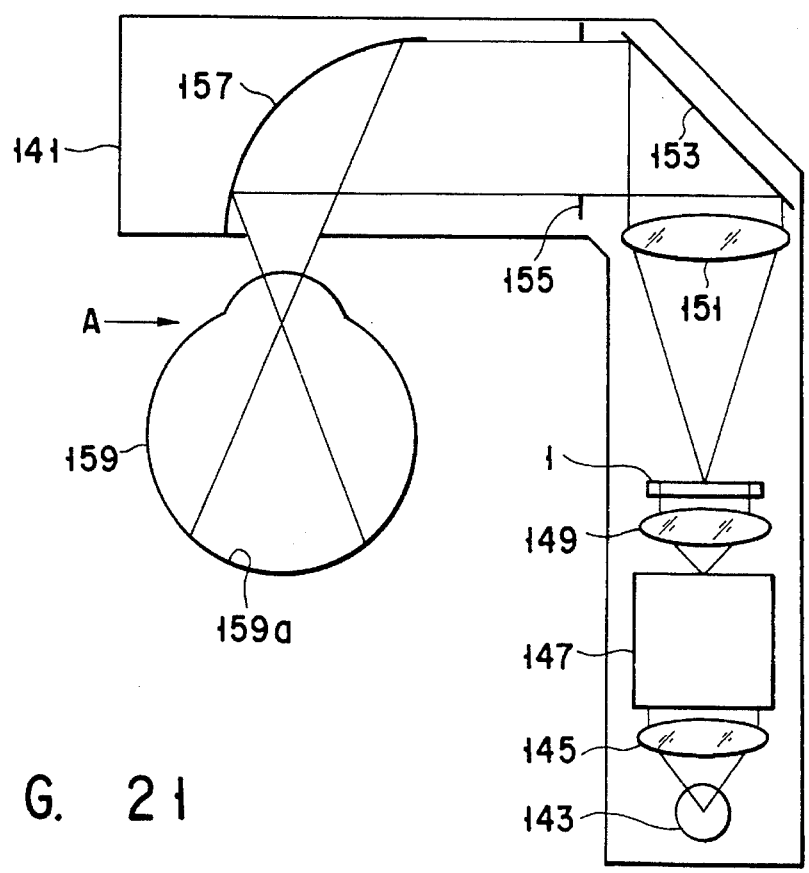
FIG. 21 shows schematically the structure of an image display apparatus according to an eleventh embodiment of the invention.

As is shown in FIG. 21, the image display apparatus according to this embodiment is a one-eye image display apparatus having a shape attachable to the head (not shown) of the observer. This apparatus has a body 141 of a substantially L shape, which extends horizontally from the location of the observer's eye 73 so that it can be attached to a side portion of the head, or which extends vertically so that it can be attached to a top portion of the head.

In the body 141, light emitted from a white light source 143 is condensed by a condensing lens 145 and then the coherence of the light is enhanced by a spatial filter 147. Then, the light is radiated on an image display unit 1 (see FIG. 1) via a collimator lens 149.

A Fourier-transform image produced and displayed on the image display unit 1 is focused on the pupil face A Of the observer's eye 159 via a lens 151, a flat mirror 153, a mask 155 and a concave mirror 157. Then, an original image is produced on the retina 159a of the eye 159.

This apparatus is applicable widely to displays (not shown) of conventional TV sets and displays (not shown) of computers and word-processors. In addition, since the body 141 can be manufactured with small size and light weight, a realistic image can be displayed even in a narrow place.

An image display apparatus according to a twelfth embodiment of the present invention will now be described with reference to FIG. 22. In the following description of the twelfth embodiment, the same structural elements as in the eleventh embodiment are denoted by like reference numerals and a description thereof is omitted.

Figure 22:
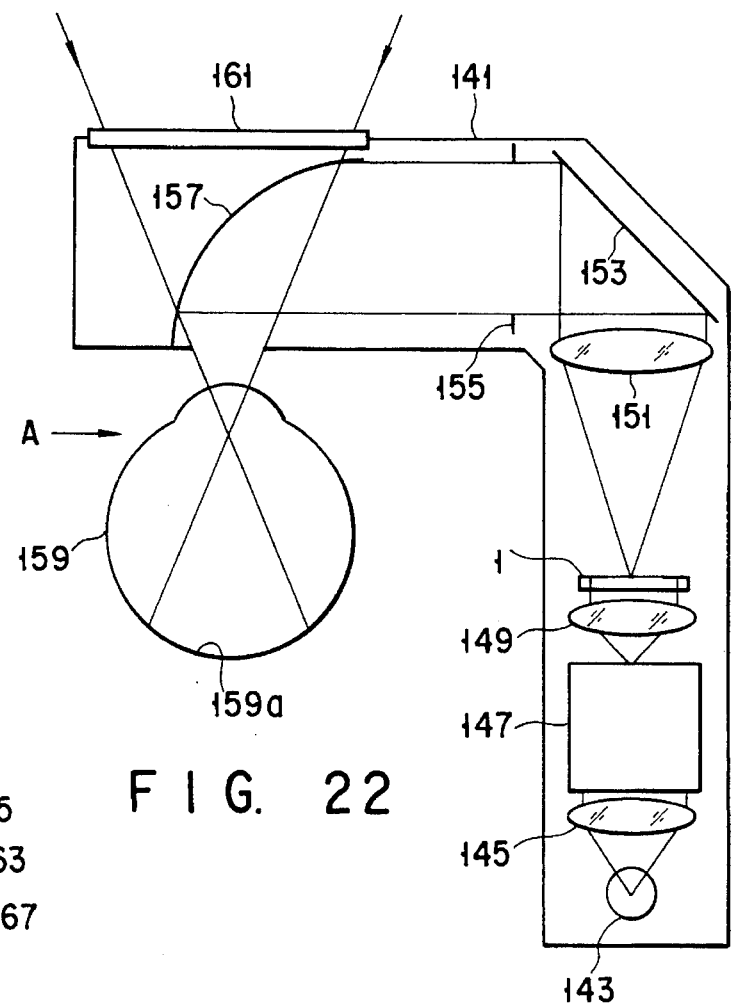
FIG. 22 shows schematically the structure of an image display apparatus according to a twelfth embodiment of the invention.

As is shown in FIG. 22, in this apparatus, a concave mirror 157 is formed of a semi-transmissive material. An LC shutter 161 is provided for synthesizing, if necessary, an image supplied via the concave mirror 157 and an external image in front of the observer's eye 159.

In this embodiment, when the size and/or shape of field of vision is determined by the mask 155 provided near the object-side focal plane of the concave mirror 157, the focus of the observer's eye 159 is set at the indefinite point.

An example in which such characteristics are utilized is an automobile display to be mounted within an automobile. As regards a conventional automobile display, the eye is normally set at a far focal point during driving. When viewing various alarm lights or speed meters on a dashboard, the eye must be moved downward and the focal point set at a near point. When the eye is directed to the front again, the focal point of the eye must be adjusted to a far point.

According to the apparatus of the present embodiment, one can acquire information on various alarm lights and speed meters without the need to turn the eye greatly or to change the refraction state of the eye 159. In addition, according to this embodiment, since a wide-image-angle image can be obtained in principle, a display with high safety and high visual recognition properties can be provided without intercepting the visual field. Furthermore, this image display apparatus having the above features is applicable to displays of navigation systems for drivers or operators of transport means such as trains, ships, airplanes and spacecrafts as well as automobiles.

A one-eye image display apparatus according to a 13th embodiment of the invention will now be described. In the following description of the 13th embodiment, the same structural elements as in the twelfth embodiment are denoted by like reference numerals and a description thereof is omitted.

In general, a visual field meter comprises a semi-spherical screen (not shown) having a radius of about 30 cm and a projector (not shown) for projecting light stimula. The range of visual field in which light stimula are sensed is measured in the state in which the eye of the subject is situated at the center of the semi-spherical screen and the distance between the eye and the screen is kept constant.

However, when the visual field of a person with abnormal refraction is measured by means of a conventional visual field meter, there occurs problems in that the visual field is intercepted by spectacles or a sharp optical stimulus cannot be presented on the retina. Consequently, exact measurement cannot be effected.

Figure 23:
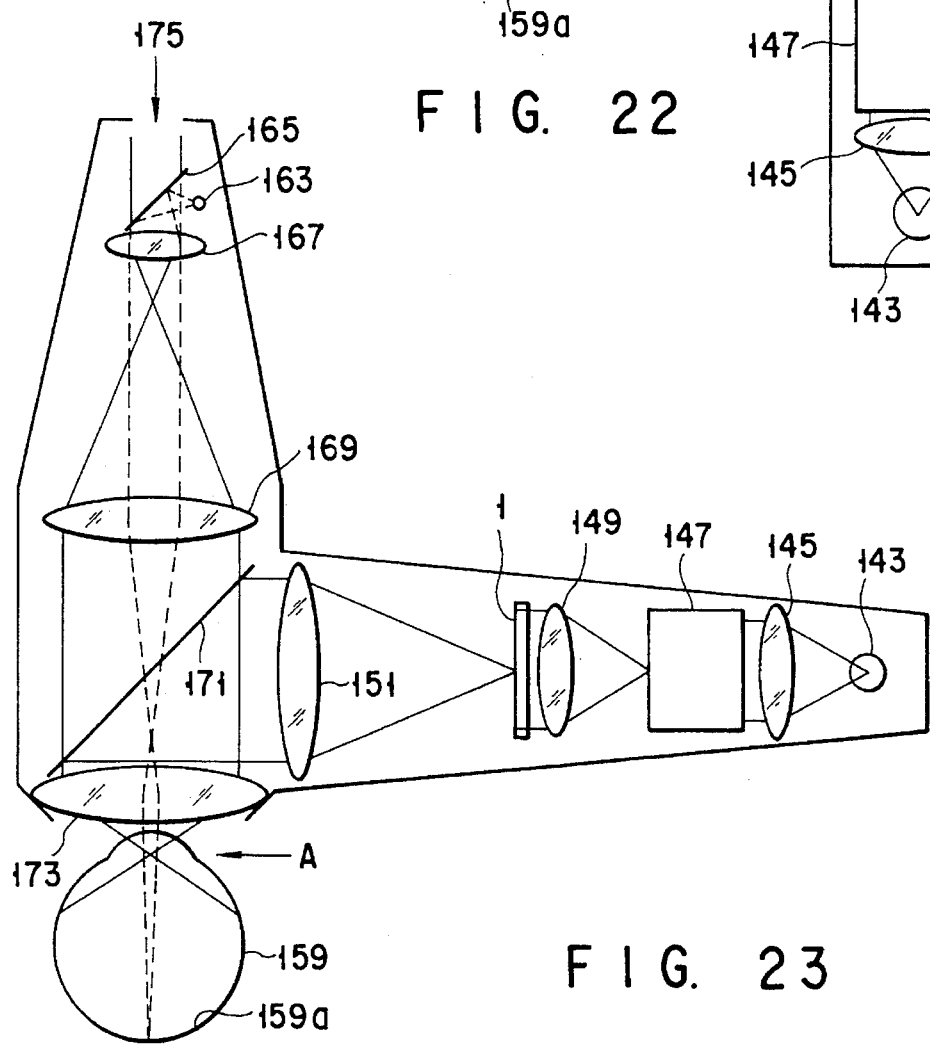
FIG. 23 shows schematically the structure of an image display apparatus according to a 13th embodiment of the invention.

To solve these problems, the body of the one-eye image display apparatus according to this embodiment contains, as shown in FIG. 23, a stationary visual indication optical system for presenting a stationary visual indication image at a desired location on the retina 159a, a fixed-looking monitoring optical system for monitoring whether the subject is looking at the stationary indicator fixedly, and a light stimulation optical system for applying a predetermined ligth stimulus to a peripheral area of the retina 159a while the subject is looking the stationary visual indicator.

An example of the operation of the one-eye image display apparatus of this embodiment will now be described.

The observer's eye 159 is situated to face the eye lens of the apparatus. Then, a predetermined stationary visual indication image is presented on the retina 159a of the eye 159 via the stationary visual indication optical system.

Specifically, in the stationary visual indication optical system, the stationary visual indication image produced by a stationary visual indicator producing means 163 such as an LED is focused on the retina 159a via a first beam splitter 165, first and second lenses 167 and 169, a second beam splitter 171, a focusing lens 173 and the optical system of the eye 159.

At this time, the state in which the subject is fixedly looking at the stationary visual indication image properly is confirmed by monitoring the pupil position of the subject through a monitor window 175 provided on the body of the apparatus.

The stationary visual indication optical system is provided with an alignment mark (not shown). Through the monitor window 175, one can see the alignment mark and the subject's eye in an overlapped manner.

The fixed-looking state of the subject is determined by the positional relationship between the alignment mark and the pupil.

When the stationary indication image is aligned with the center of the pupil face A, a predetermined light stimulus is applied to a predetermined location on the retina 159a via the light stimulation optical system. Since the light stimulation optical system has substantially the same structure as the apparatus of the above-described embodiment, the common structural elements are denoted by like reference numerals.

With the above structure, a light beam emitted from a ligth source 143 travels through a lens 145 and enters a spatial filter 147. The beam, whose coherence has been enhanced by the spatial filter 147 is focused on the retina 159a via the lens 149, LC display element 1, lens 151, beam splitter 171, lens 173 and the optical system of the eye 159. As a result, the predetermined light stimulus is applied to the retina 159a.

According to this embodiment, unlike the semi-spherical screen, the visual field of 180 !k is not obtained. However, after it is confirmed through the observation window 175 whether the subject is looking at the stationary visual indication image, the light stimulus can be applied directly onto the retina 159a. Thus, a sharp light stimulus can be presented, irrespective of the kind of the refraction state of the eye 159. As a result, the visual field of the subject requiring high-level refractive correction can be exactly measured without refraction-correcting means such as spectacles.

An image display apparatus according to a 14th embodiment of the invention will now be described with reference to FIG. 24.

Figure 24:
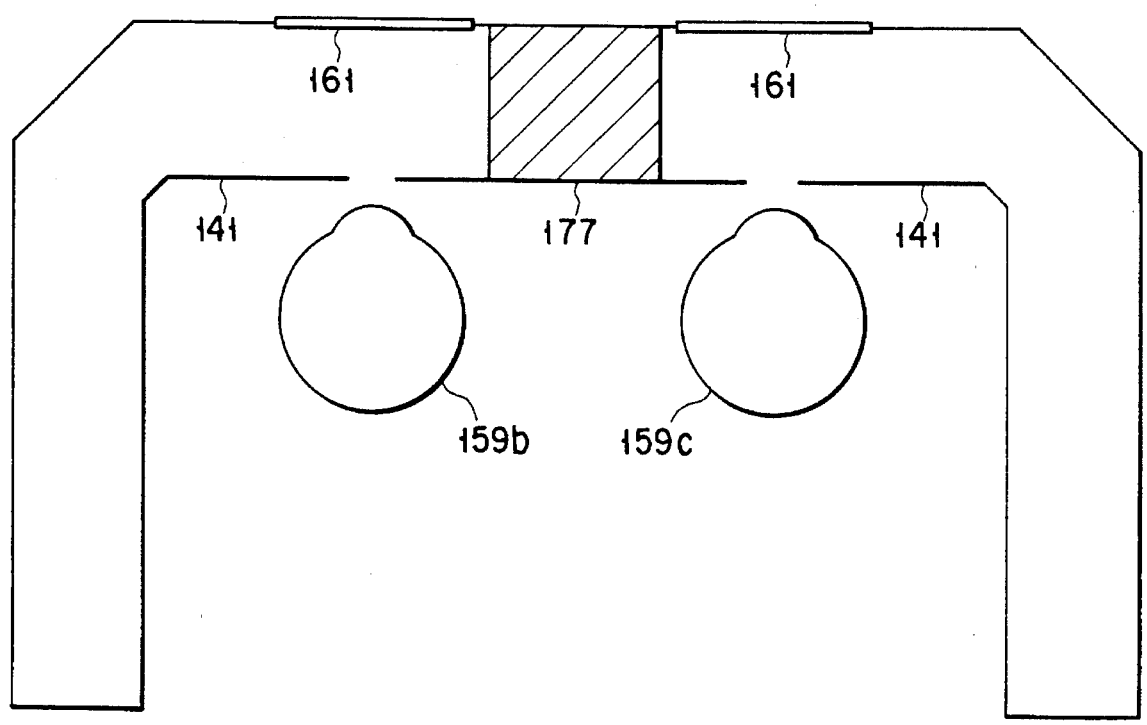
FIG. 24 shows schematically the structure of an image display apparatus according to a 14th embodiment of the invention.

As is shown in FIG. 24, this embodiments employs two sets of the one-eye image display apparatus (see FIG. 21) according to the eleventh embodiment, and these sets are connected by a connecting member 177.

With this structure, images accompanied with appropriate parallax error information are input to the left and right eyes 159b and 159c, and a three-dimensional image can be displayed.

Conventionally, in this type of image display apparatus, it has been requested that a wide-image-angle, high-fine image be displayed in order to achieve virtual reality or realisic feeling.

However, in the conventional apparatus, limitations due to the spatial resolution characteristics of an LC element array, etc. for producing images are added to the resolution characteristics of the entire optical system, and it is not possible to provide the ritht and left eyes with a high spatial frequency component or a slight parallax.

To solve this problem, as shown in FIG. 24, two sets of the image display apparatus according to the eleventh embodiment are connected to successively produce any kind of parallax on the retinae of the eyes 159b and 159c. Three-dimensional realistic feeling obtained by this is natural and a very realistic image can be obtained.

In this embodiment, for the purpose of simplicity, two sets of the same one-eye image display apparatus are connected. However, optical members of a ligtht source, a spatial filter, etc. may be provided at the center of rigth and left apparatuses so that these members may be used commonly. In addition, as in the twelfth embodiment, (see FIG. 22), a member for easily controlling transmission/interception of light, such as LC shutter 161, may be situated in front of the eye, so that the internal image may be synthesized with an external image, if necessary.

In the apparatus according to each of the above embodiments, the spatial resolution of the entire optical system is determined irrespective of the characteristics of the image display unit and the optical system of the eye. Therefore, a clear image can be obtained, irrespective of the refraction condition of the eye, without the need to correct the refraction by means of spectacles or contact lenses during observation or to adjust the visibility at the time of use.

Furthermore, since the image display unit and the retina are not in a conjugated relationship, the spatial resolution of the image is not limited by the image density, etc. of the image display unit. This is advantageous, in particular, in increasing the image angle. Unlike prior-art optical systems, the spatial resolution is not degraded by increasing the magnification.

Besides, since an image angle is determined by the angular aperture of the eye lens or the pixel size of the image display element, the wide image angle can be easily increased. Almost all light is condensed at or near a center area of the pupil face, the incident light is not intercepted by the iris, and a bright image can be obtained.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image display apparatus comprising:

display means for producing and displaying a Fourier transformed image of an original image; and optical means for forming the Fourier transformed image displayed by the display means near a pupil plane of an observer's eye so that the original image is produced on the retina of the eye.

2. An image display apparatus as in claim 1, wherein the optical means comprises a lens unit for making the display means conjugate with the pupil plane of the observer's eye so that a Fourier transform of the Fourier transformed image displayed by the display means is produced on the retina of the eye.

3. An image display apparatus as in claim 2, wherein the lens unit comprises a first lens having a primary focal plane and a second lens having a secondary focal plane, the display means is located on the primary focal plane of the first lens, the pupil plane of the observer's eye is located on the secondary focal plane of the second lens, and a secondary focal point of the first lens coinciding with a primary focal point of the second lens.

4. An image display apparatus as in claim 3, wherein the display means comprises:

a point light source;

a third lens with a secondary focal point coincident with the primary focal point of the first lens for focusing the light beam from the point light source;

a prism located between the secondary focal point of the third lens and the first lens for forming two symmetric points about the optical axis; and driving means for moving the prism in a predetermined direction.

5. An image display apparatus as in claim 4, further comprising:

an optical member with two parallel planes, which is rotatable and located between the first lens and the second lens, for providing displacement for the points formed by the prism; and controlling means for controlling the rotation of the optical member.

6. A method of arranging an optical axis of an display apparatus recited in claim 3 to an optical axis of the observer's eye, comprising the step of:

moving an aperture placed between the first lens and the second lens along the optical axis of the display apparatus until the two images of the aperture are formed on the retina of the observer's eye;

moving the observer's eye position in a plane perpendicular to the optical axis of the display apparatus until the two images of the aperture have the same brightness; and moving the aperture placed between the first lens and the second lens along the optical axis of the display apparatus until two images of the aperture become a single image.

7. An image display apparatus as in claim 1, wherein the display means comprises:

a light source;

a first polarizer for transmitting a predetermined polarization component of a light beam emitted from the light source;

first polarization direction controlling means with a plurality of pixels for controlling a polarization direction of the light beam transmitted from the first polarizer for pixels, each of which represents a spectrum of the Fourier transformed image to be displayed; and a second polarizer for transmitting a predetermined polarization component of the light beam transmitted from the first polarization direction controlling means.

8. An image display apparatus as in claim 7, wherein the first polarization direction controlling means comprises a liquid crystal device having a plurality of pixels.

9. An image display apparatus as in claim 7, further comprising:

phase control means for receiving the light beam from the second polarizer and for controlling a relative phase for each of the spectra of the Fourier transformed image to be displayed.

10. An image display apparatus as in claim 9, wherein the phase control means comprises means for controlling an optical path length for each of the spectra of the Fourier transformed image to be displayed.

11. An image display apparatus as in claim 10, wherein the optical path length controlling means comprises a liquid crystal device having a plurality of pixels.

12. An image display apparatus as in claim 9, wherein the phase control means comprises means for providing a phase difference due to relative wave retardation for each of the spectra of the Fourier transformed image to be displayed.

13. An image display apparatus as in claim 12, wherein the phase difference providing means comprises:

second means for controlling the polarization direction of the light beam from the second polarizer for each of the pixels corresponding to the Fourier transformed image to be displayed;

a phase plate for receiving the light beam from the second polarization direction controlling means and for providing the substantial phase difference of $\pi/2$ between the polarization components perpendicular to each other, and a third polarizer for receiving the light beam from the phase plate and for transmitting a predetermined polarization component.

14. An image display apparatus as in claim 9, wherein the display means comprise:

a density filter located near the phase control means and constructed to have a transmittance which is highest at a center thereof and decreases toward a periphery thereof at a predetermined rate.

15. An image display apparatus as in claim 9, wherein the display means comprises:

a density filter located near the phase control means for eliminating a spatial frequency component exceeding a Nyquist frequency of a photoreceptor array in a human retina, the density filter having a circular opening having constant transmittance.

16. An image display apparatus as in claim 9, wherein the display means comprises:

a density filter located near the phase control means for eliminating a spectrum component inducing a reduced visual effect.

17. An image display apparatus as in claim 16, wherein the filter is constructed to have a transmittance which is highest at a center portion thereof and decreases toward a peripheral portion thereof at a predetermined rate.

18. An image display apparatus as in claim 1, wherein the display means comprises:

lens means for Fourier transforming the original image; and optical fiber means for outputting the image which is Fourier transformed by the lens means and is formed at one end thereof from another end thereof to the optical means.

19. An image display apparatus as in claim 1, wherein the display means comprises:

a light source;

beam splitting means for splitting a light beam emitted from the light source into beams;

means for directing each of the beams split by the beam splitting means; and means for optically combining the beams directed by the beam directing means.

20. An image display apparatus as in claim 19, wherein the beam directing means comprises:

modulation means for generating a diffraction beam for each of the beams split by the splitting means; and means connected to the modulation means for controlling a diffraction angle for each of the diffraction beams generated by the modulation means.

21. An image display apparatus as in claim 19, wherein the beam directing means comprises:

reflecting means with two rotational axes orthogonal each other for reflecting each beam split by the splitting means; and means for controlling rotation of the reflecting means.

22. An image display apparatus as in claim 19, wherein the light source includes a one dimensional array and the beam directing means includes reflecting means rotatable about an axis parallel to a direction of the array for reflecting each beam split by the splitting means.

23. An image display apparatus as in claim 19, wherein a one dimensional liquid crystal array is located between the light source and the splitting means, the beam directing means including reflecting means rotatable about an axis parallel to a direction of the one dimensional liquid crystal array for reflecting each beam split by the splitting means.

24. An image display apparatus as in claim 1, wherein the display means comprises:

a light source;

beam splitting means for splitting a light beam from the light source into beams;

phase control means for providing a relative phase retardation for each of the beams split by the beam splitting means;

means for providing a symmetric displacement for the light beams from the phase control means;

means for optically synthesizing the beams from the displacement providing means; and a polarizer located-between the synthesizing means and the pupil of the observer's eye for transmitting a predetermined polarization component of the beam from the synthesizing means.

25. An image display apparatus as in claim 24, wherein the displacement providing means comprises:

an optical member with two parallel planes, with two beams incident respectively on the two parallel planes from the phase control means having parallel and opposite directions to each other, and the optical member being rotatable; and means for controlling rotation of the optical member.

26. An image display apparatus as in claim 25, wherein the optical member is rotatable about two axes perpendicular to the optical axis.

27. An image display apparatus as in claim 25, wherein the optical member is rotatable about the optical axis and about one of the axes perpendicular to the optical axis.

28. An image display apparatus as in claim 1, wherein the display means comprise:

a laser array formed such that each laser element emits a coherent light beam wherein said light beams are incoherent with respect to each other, beam splitting means for splitting the beam emitted from said laser array;

image rotating means for rotating one of the split beams produced by said splitting means by 180° about an optical axis and outputting the rotated beam;

optical coupling means for optically coupling the other of said split beams produced by said splitting means and the beam emitted from said image rotating means such that these beams are arranged in a rotational symmetry; and a phase conversion element array for providing relative phase retardation for each of the spectra of the Fourier transformed image.

29. An image display apparatus as in claim 28, wherein the image rotating means includes two Porro prisms combined perpendicularly to each other.

30. An image display apparatus as in claim 1, wherein the display means comprises:

a liquid crystal element array for producing and displaying the Fourier transformed image; and a micro-lens array positioned such that a laser beam incident on each of micro-lenses thereof has a focal point near a center of each pixel of the liquid crystal array.

31. An image display apparatus wearable on a head of an observer, comprising:

a white light source;

a collimation lens for collimating a light beam from the white light source, to produce a parallel light beam;

display means located in the parallel light beam from the collimation lens for displaying a Fourier transformed image of an original image; and optical means for forming the Fourier transformed image displayed by the display means on a pupil plane of the observer's eye so that the original image is formed on the retina of the eye.

32. An image display apparatus as in claim 31, further comprising:

an optical shutter for controlling a image provided for the observer, which combines the image produced by the display means and a image of outer world.

* * * * *